April 23, 1963   T. B. KEESLING   3,086,638
FRUIT PREPARATION MACHINE
Original Filed March 3, 1953   25 Sheets-Sheet 1
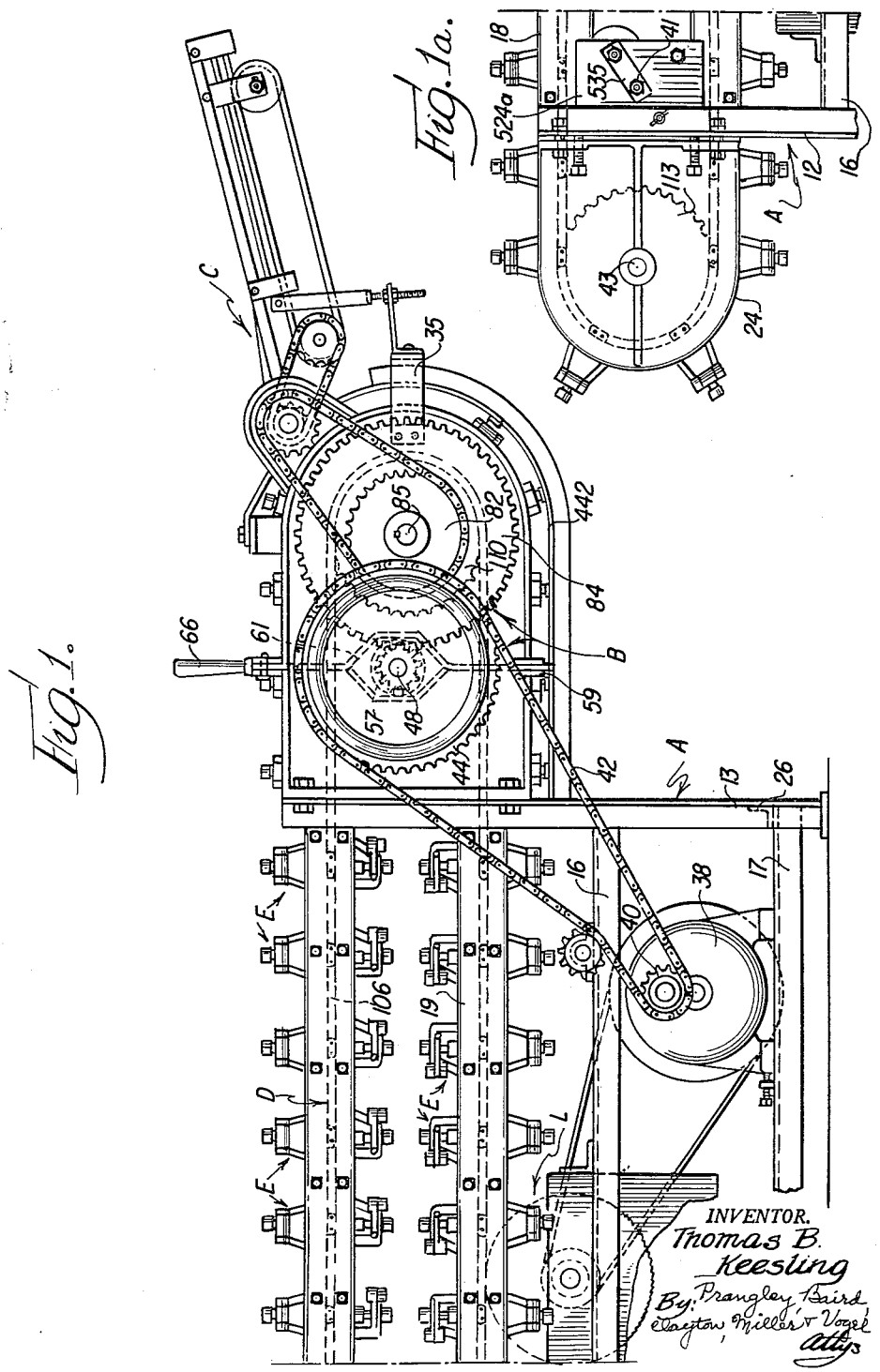
INVENTOR.
Thomas B. Keesling
By Prangley Baird
Clayton, Miller & Vogel
Attys

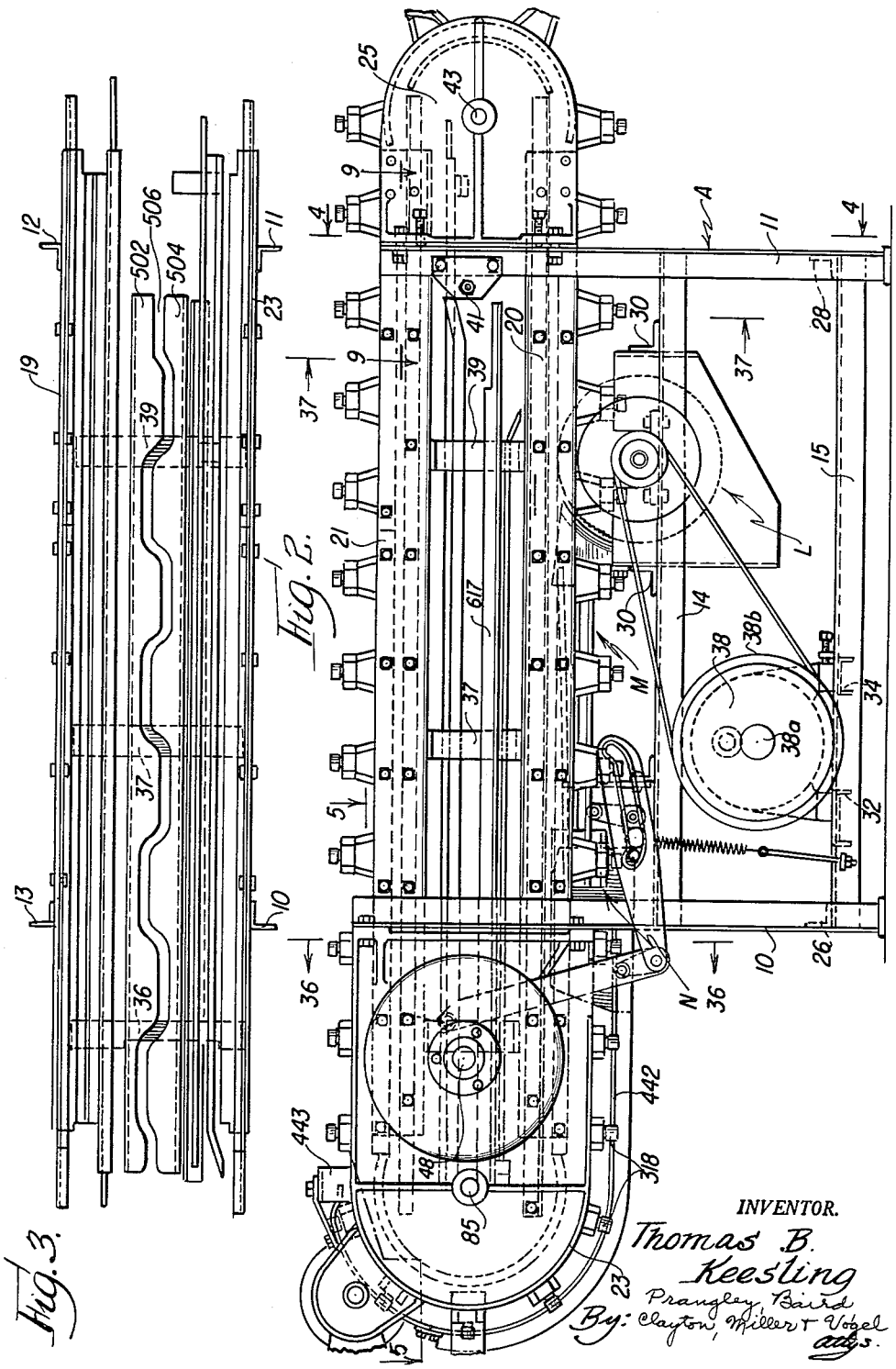

April 23, 1963 T. B. KEESLING 3,086,638
FRUIT PREPARATION MACHINE
Original Filed March 3, 1953 25 Sheets-Sheet 3
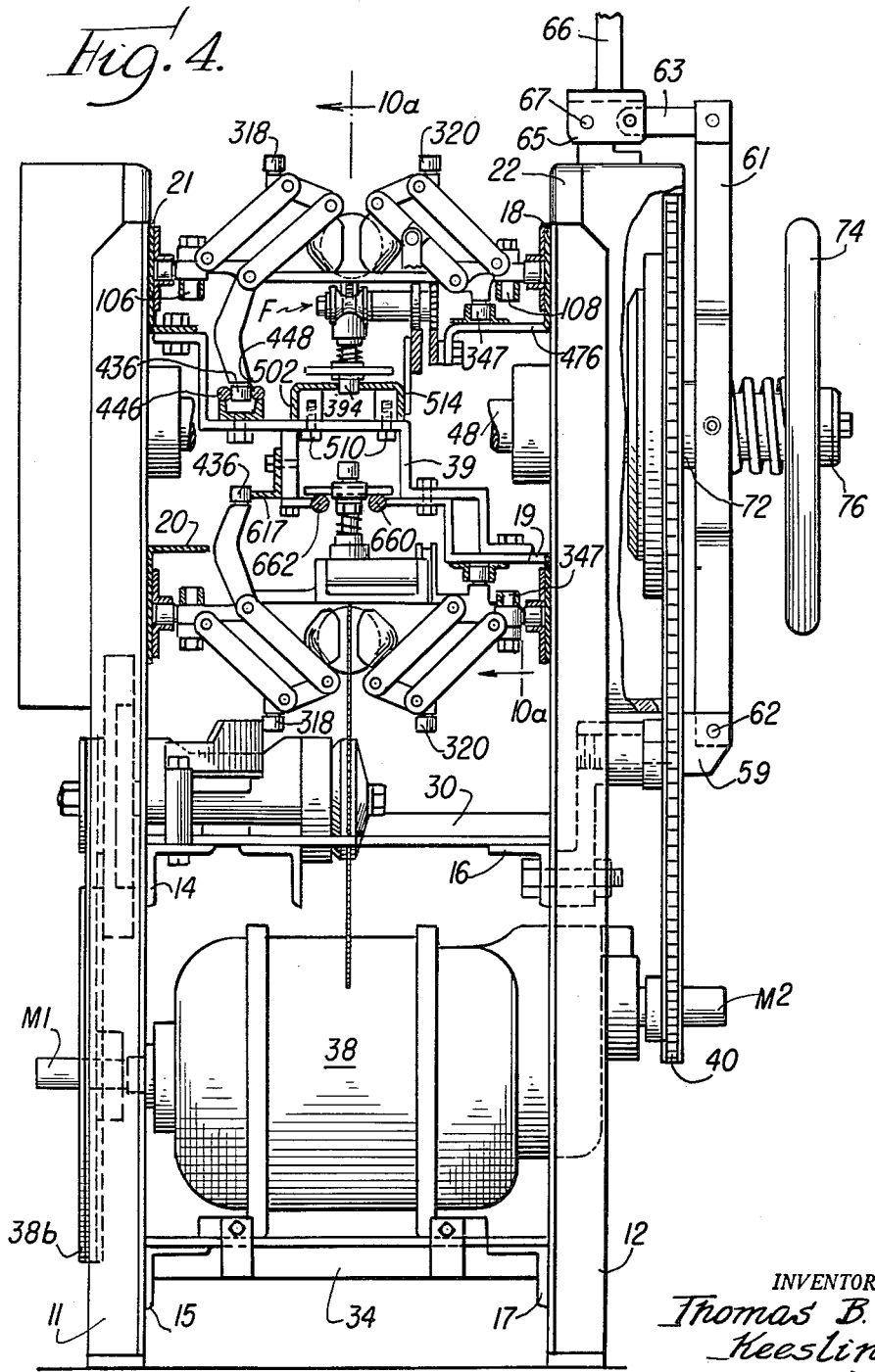

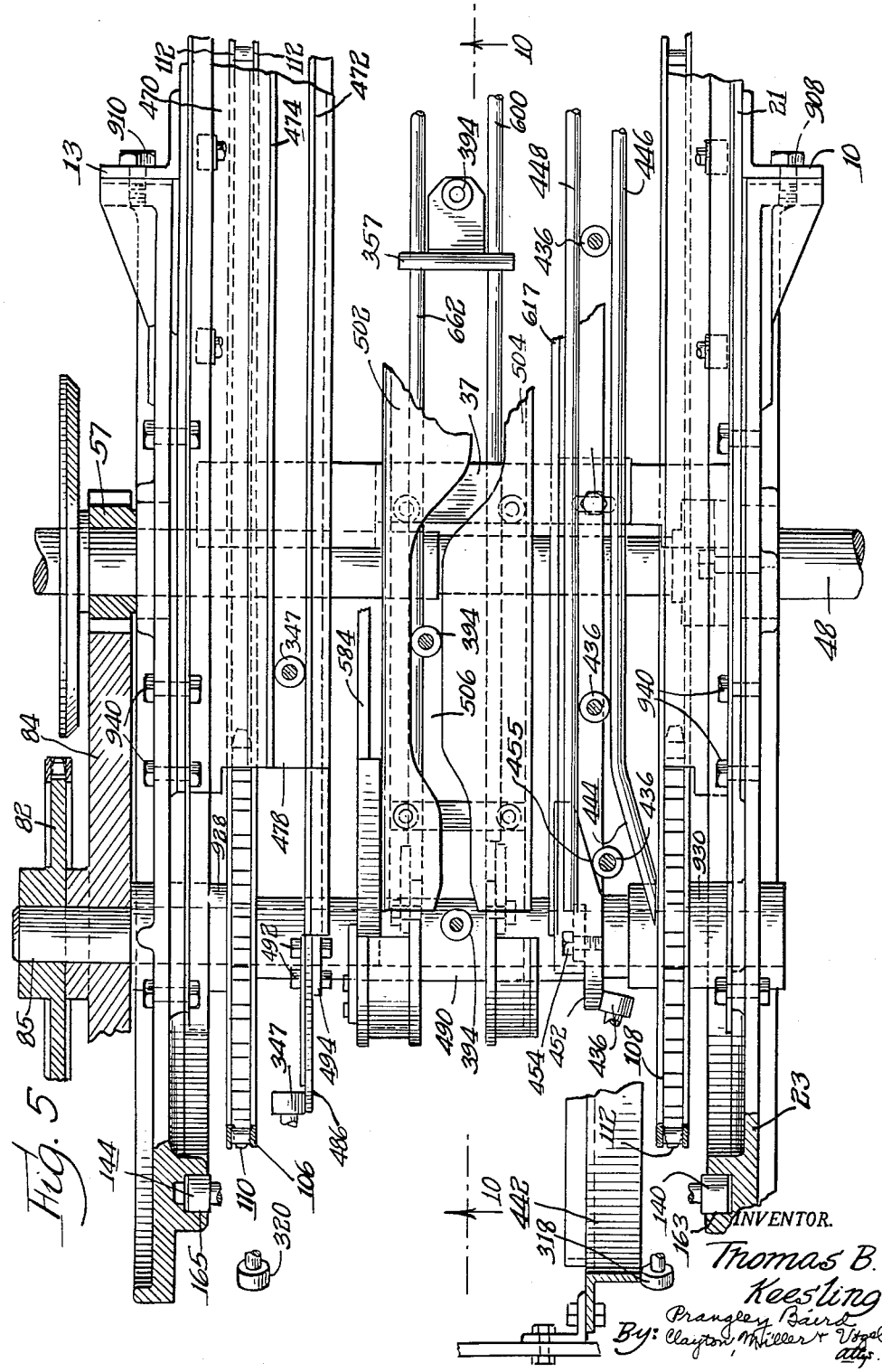

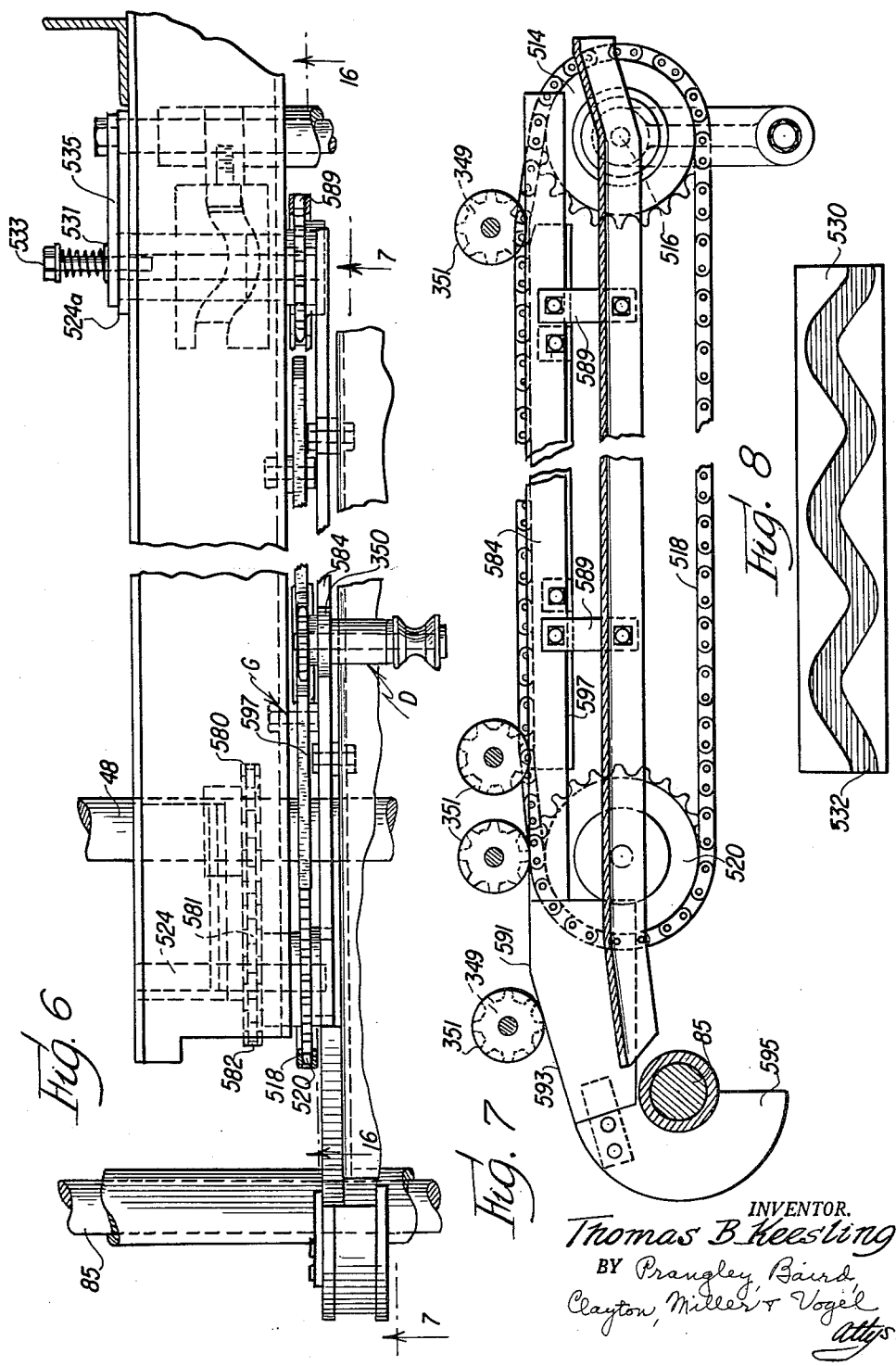

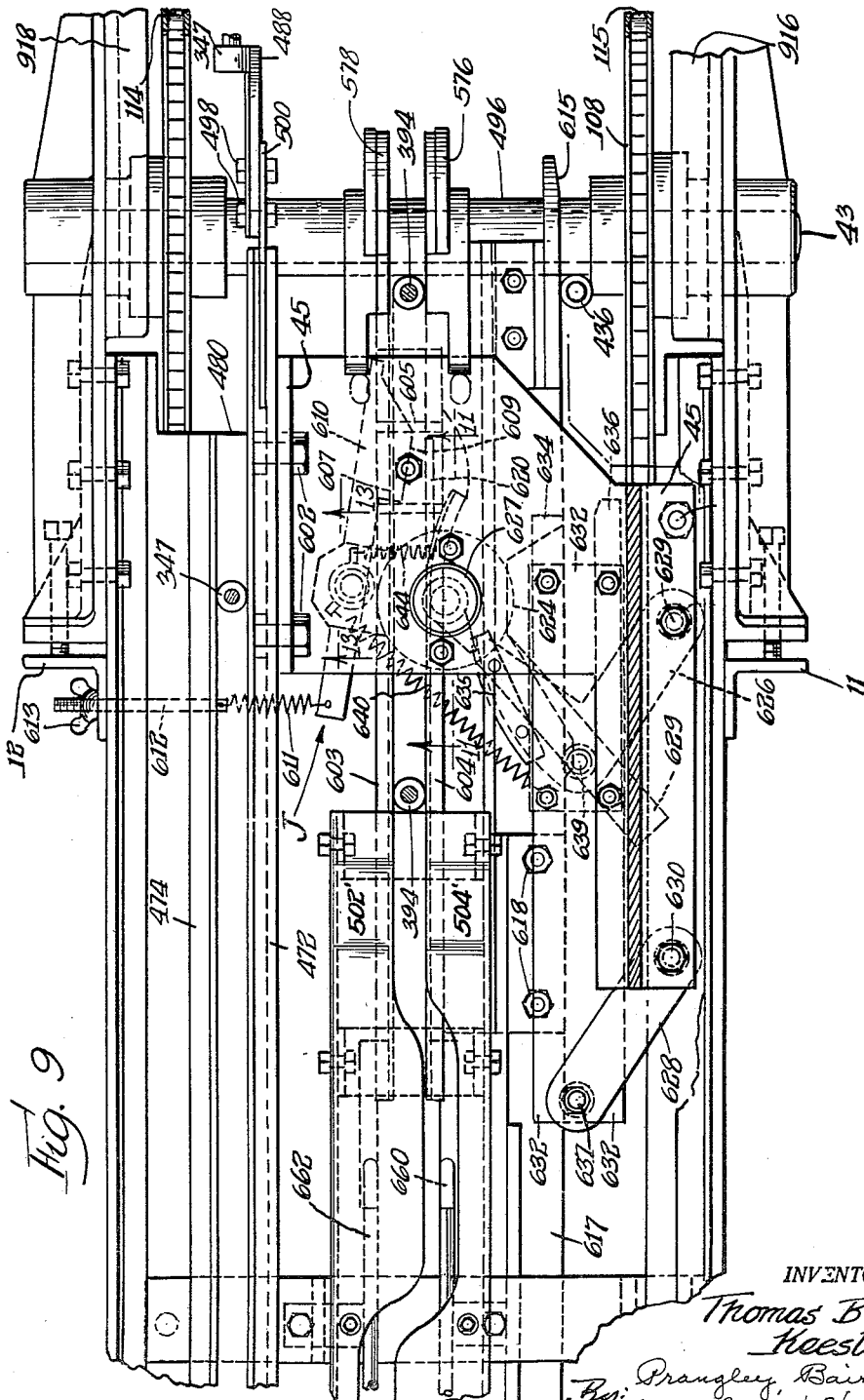

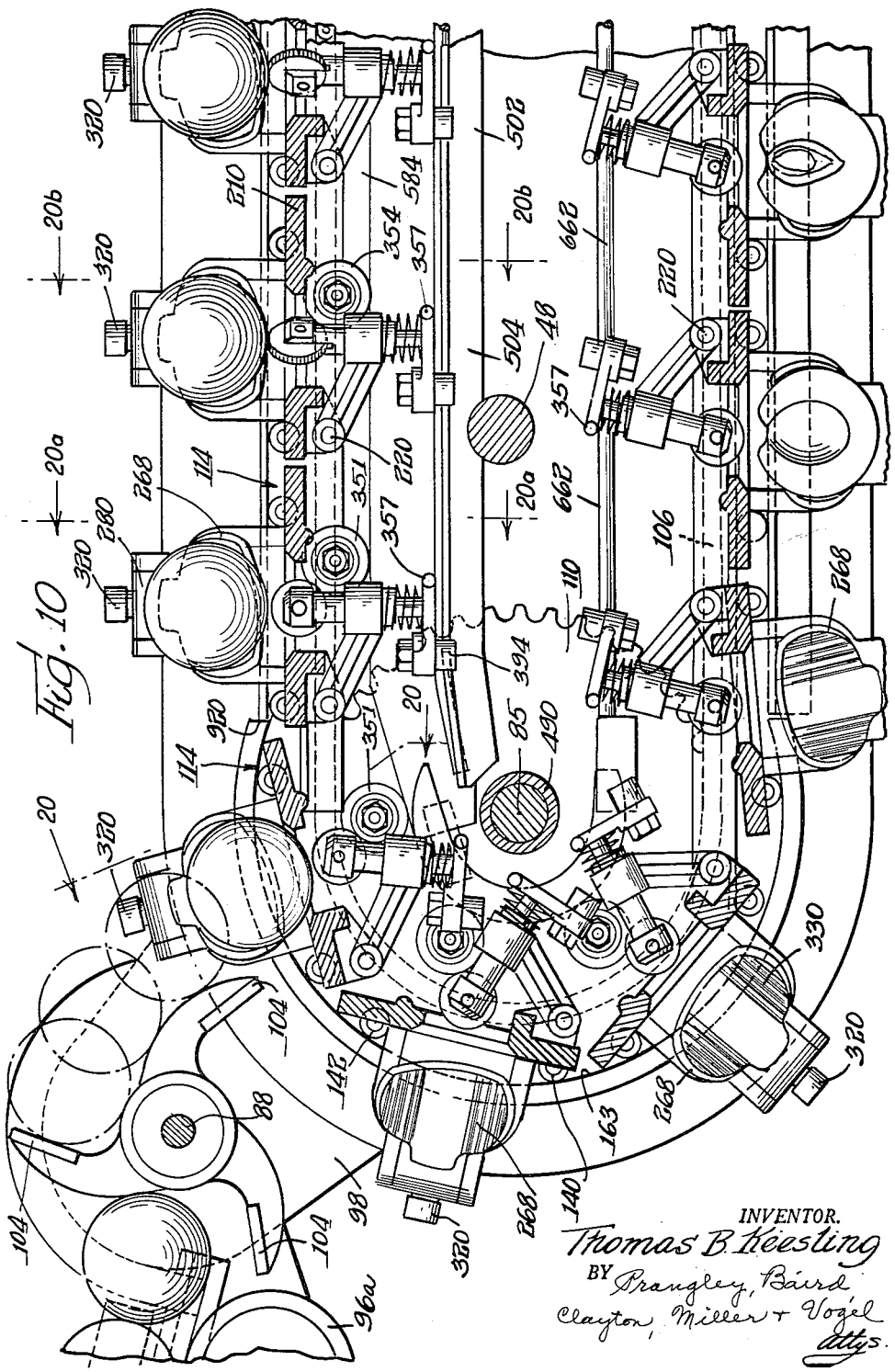

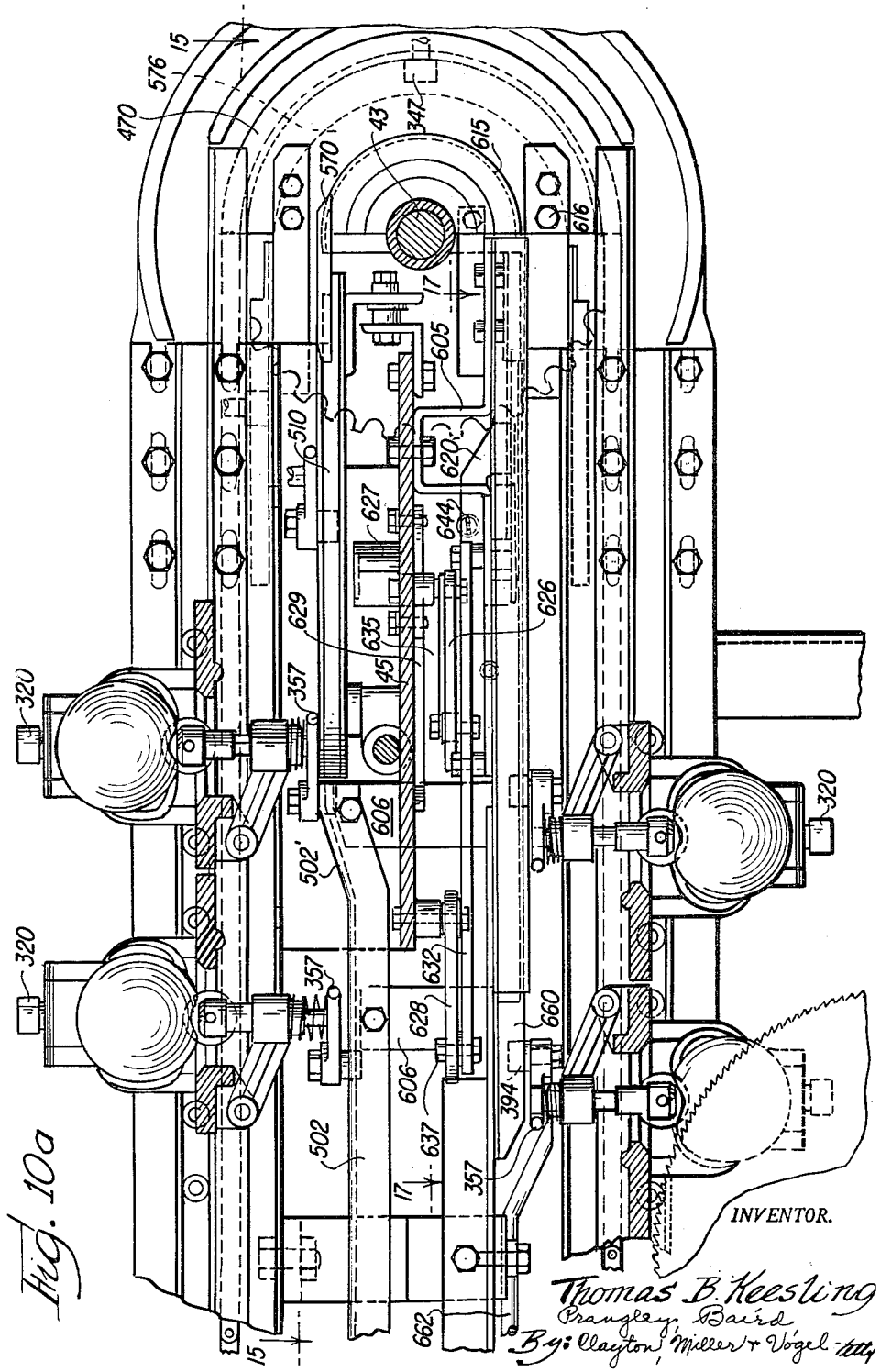

April 23, 1963   T. B. KEESLING   3,086,638
FRUIT PREPARATION MACHINE
Original Filed March 3, 1953   25 Sheets-Sheet 9
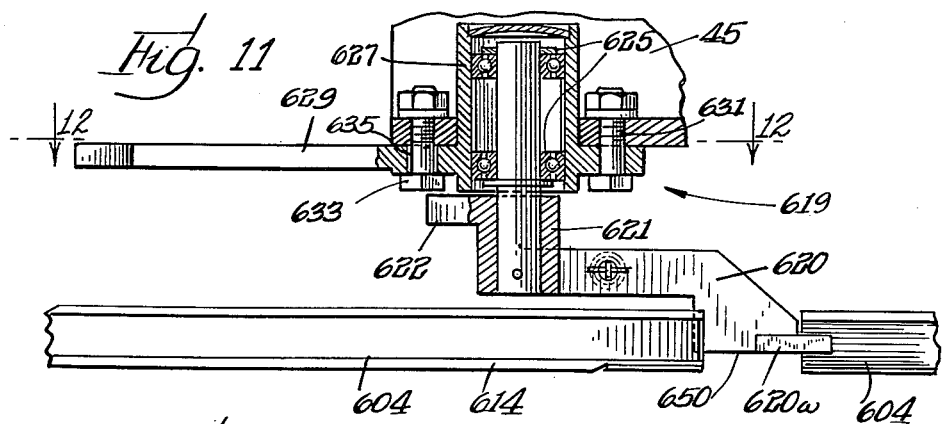
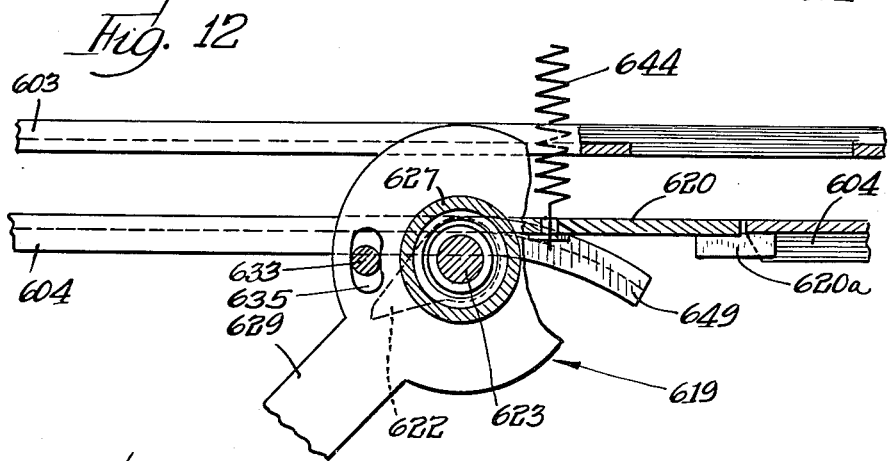
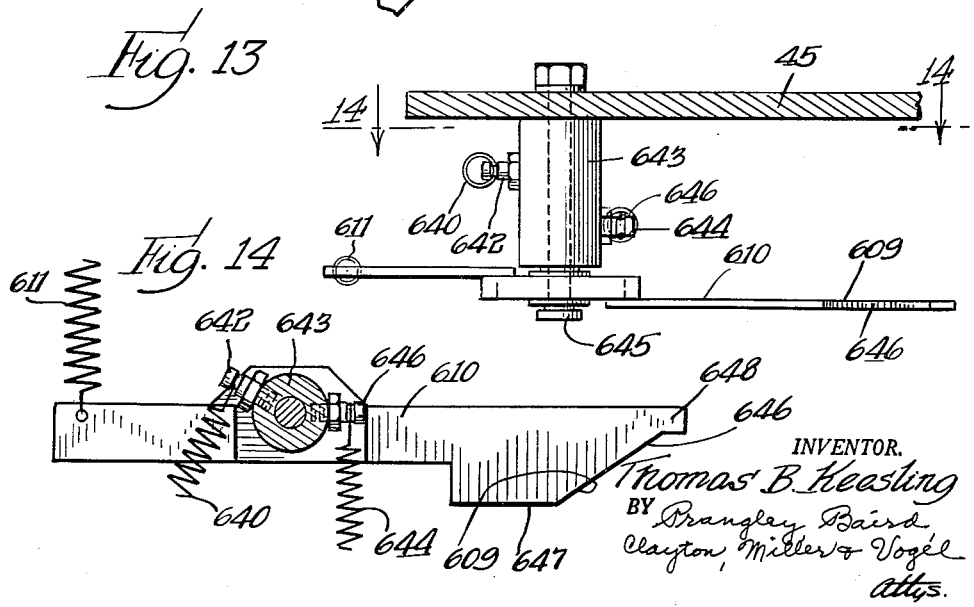
INVENTOR.
Thomas B. Keesling
BY Brangley Baird
Clayton, Miller & Vogel
attys.

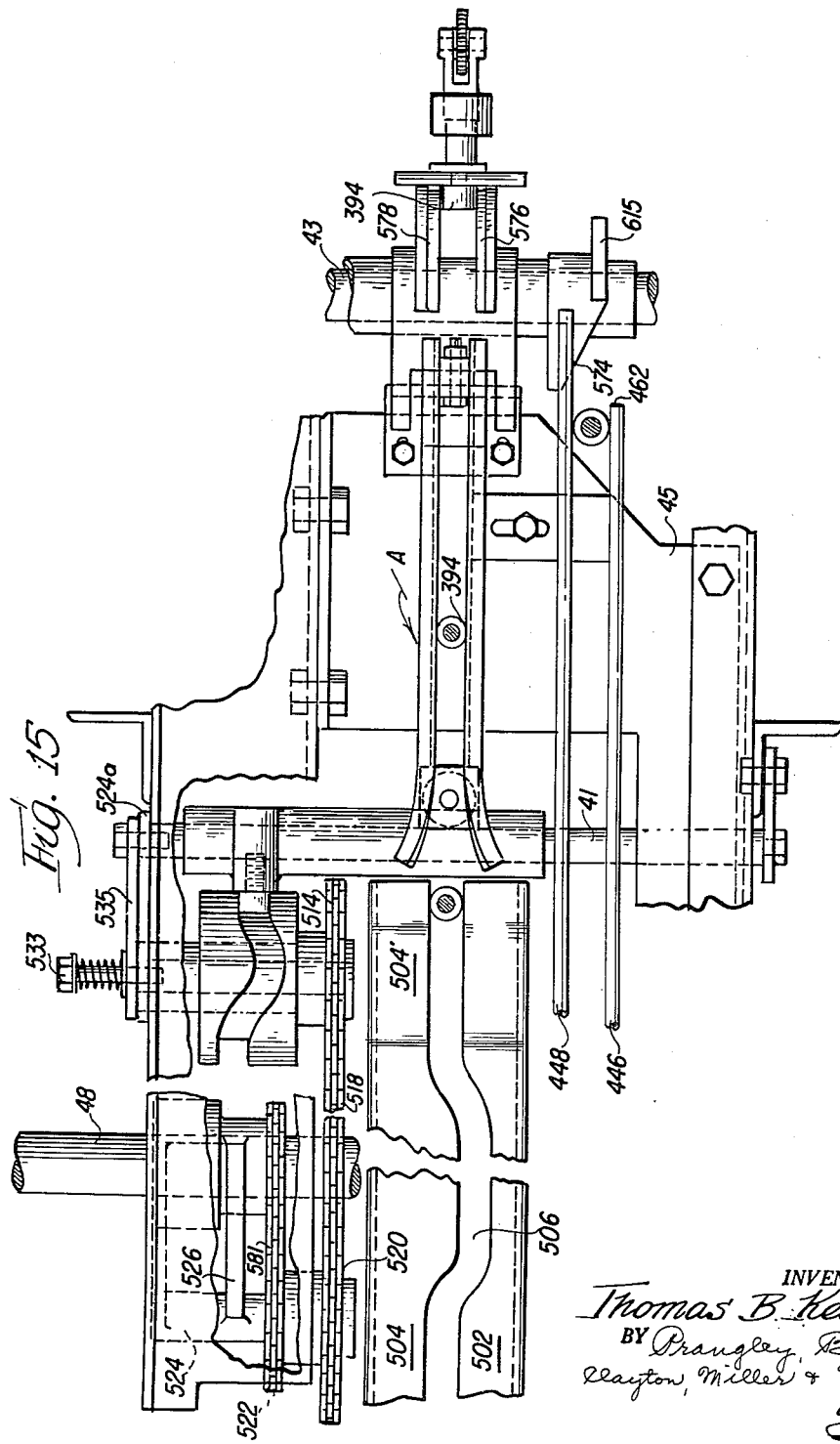

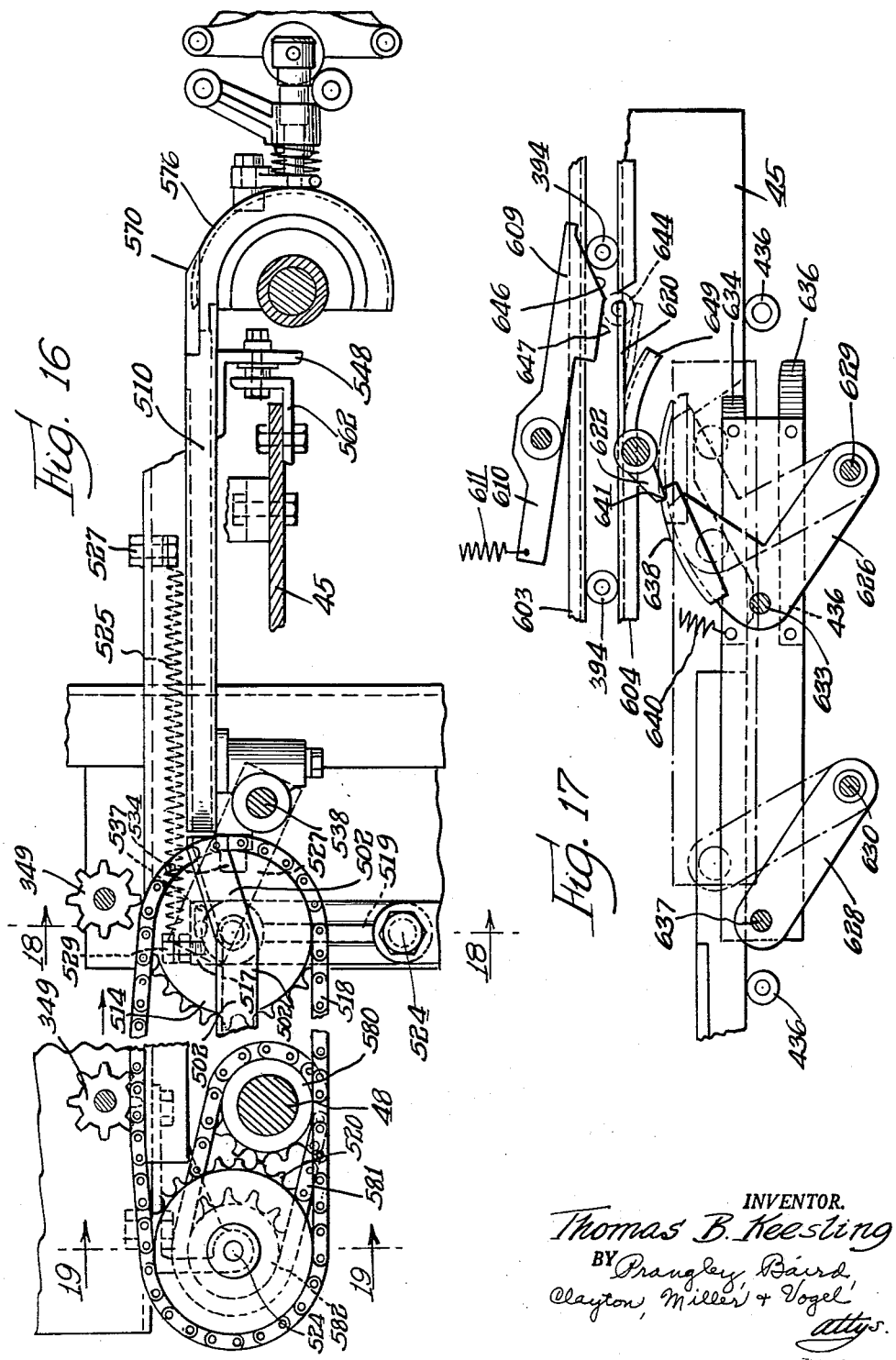

April 23, 1963   T. B. KEESLING   3,086,638
FRUIT PREPARATION MACHINE
Original Filed March 3, 1953   25 Sheets-Sheet 12
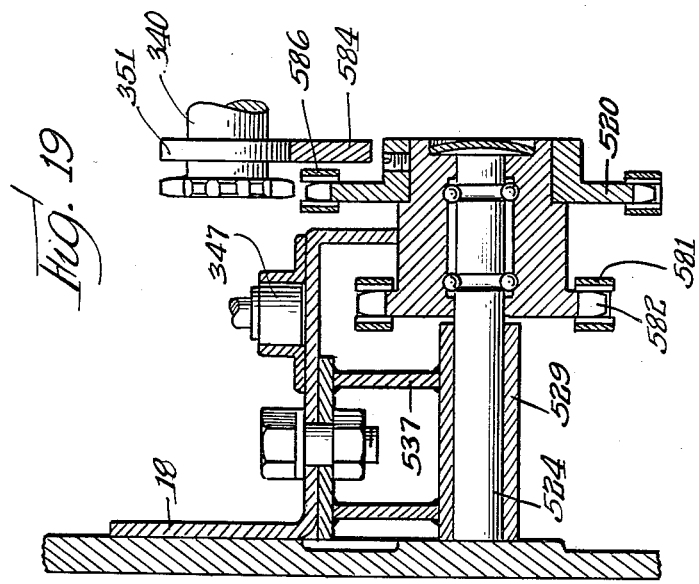
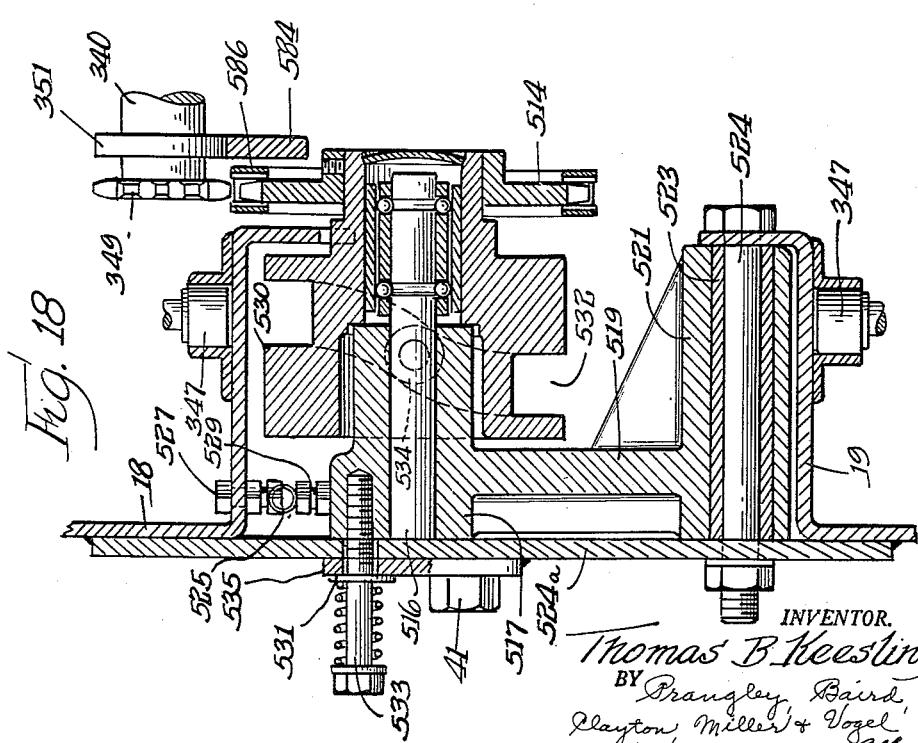
INVENTOR.
Thomas B Keesling
BY Brangley, Baird,
Clayton, Miller & Vogel
Attys.

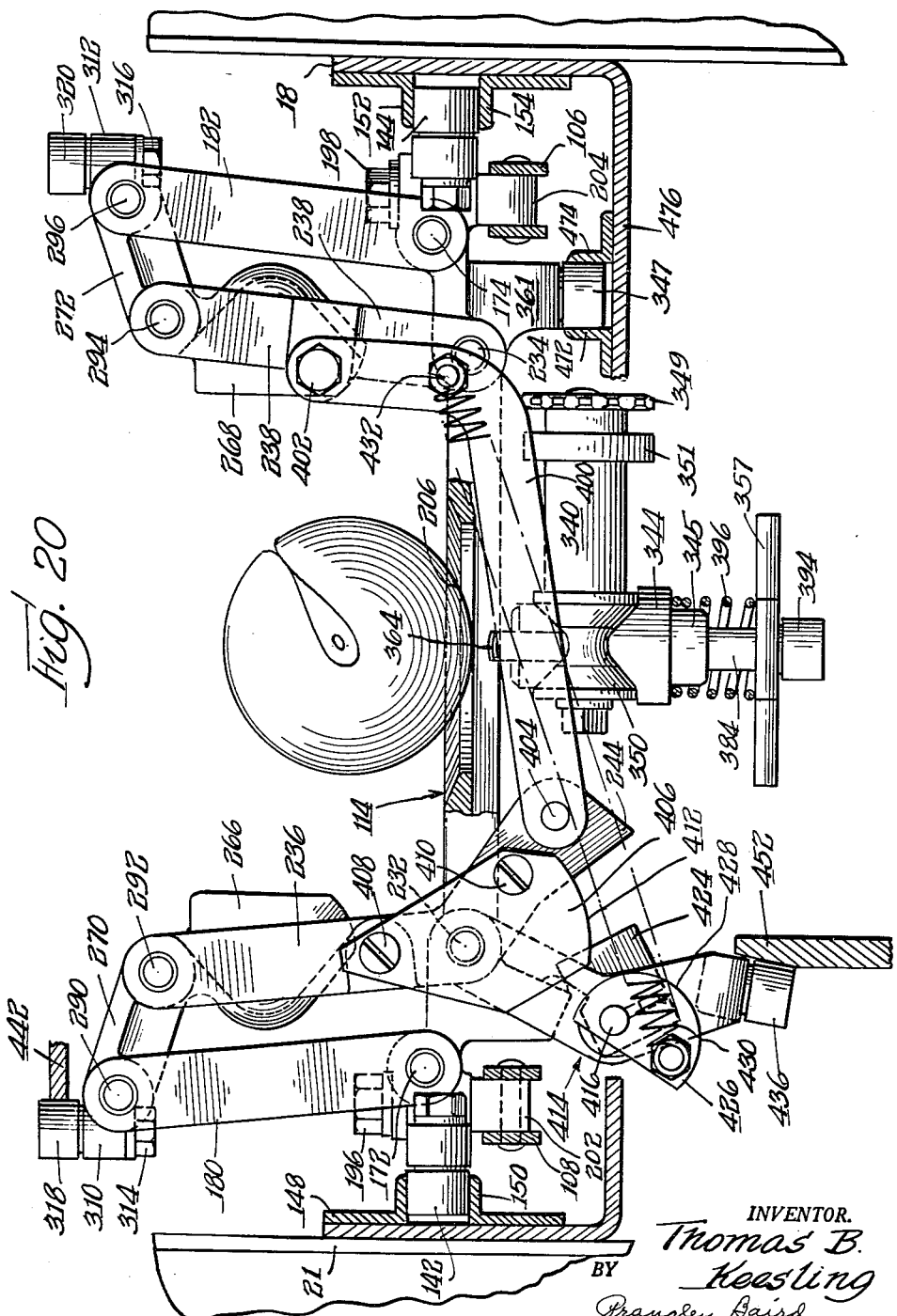

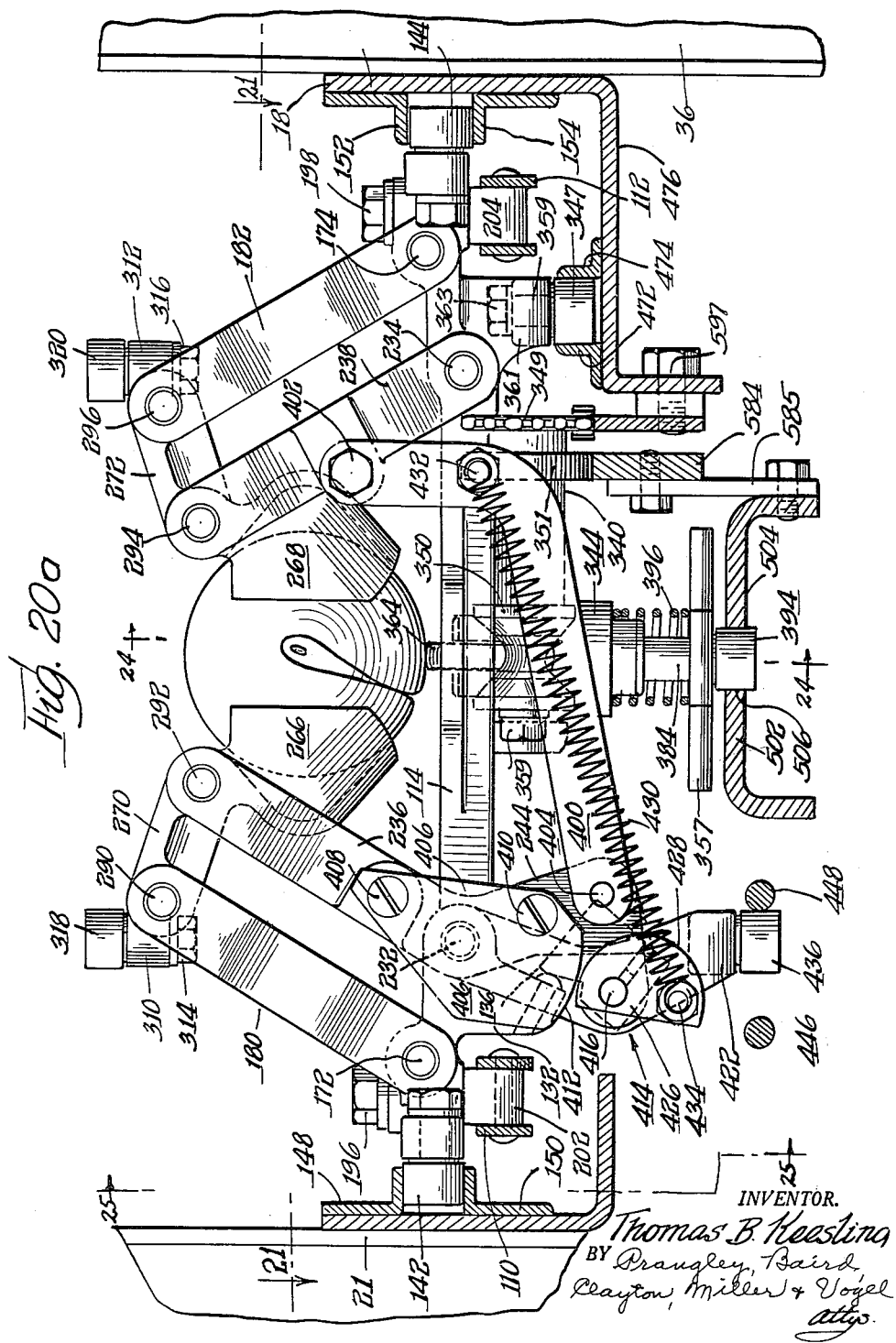

Fig. 20b

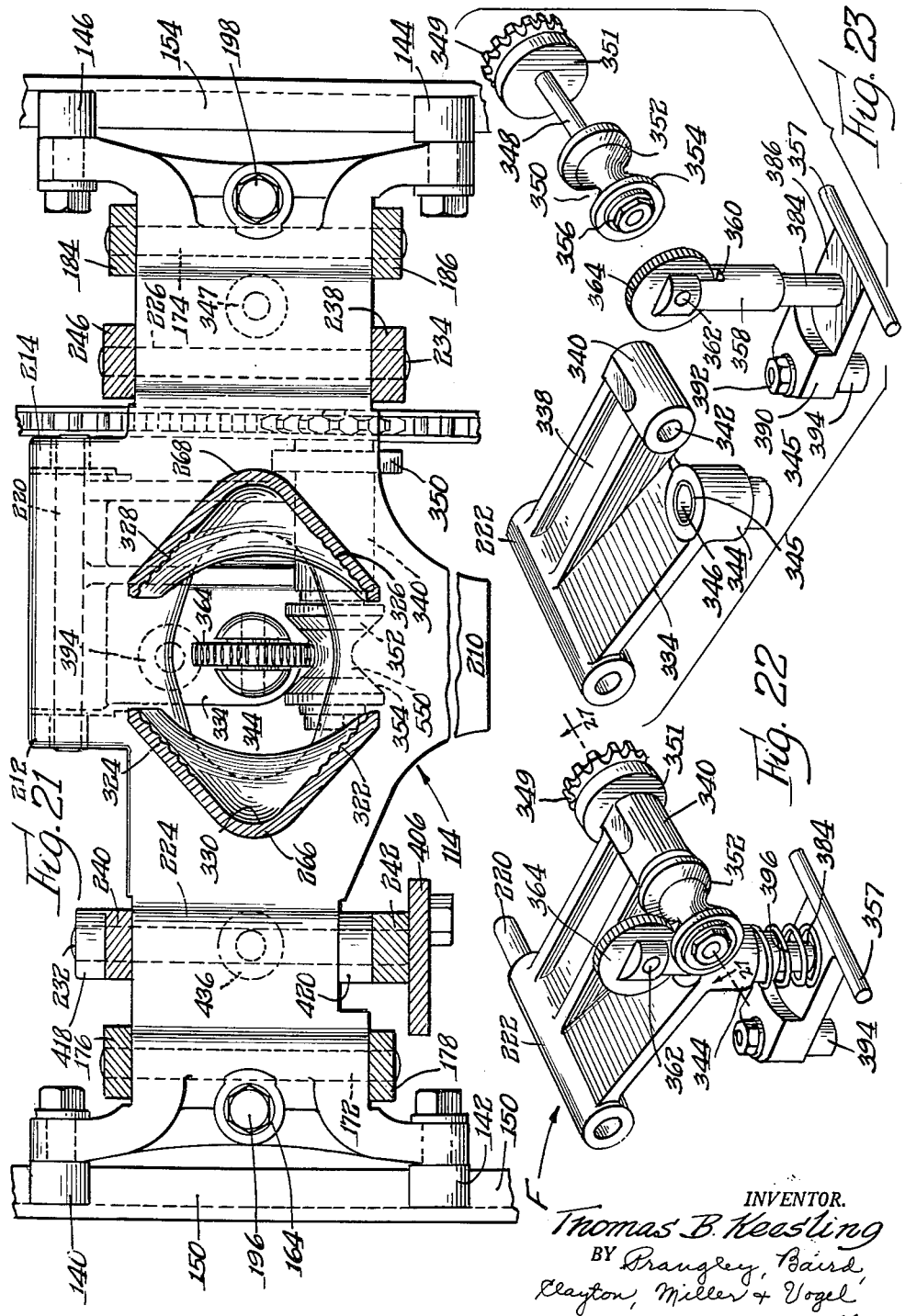

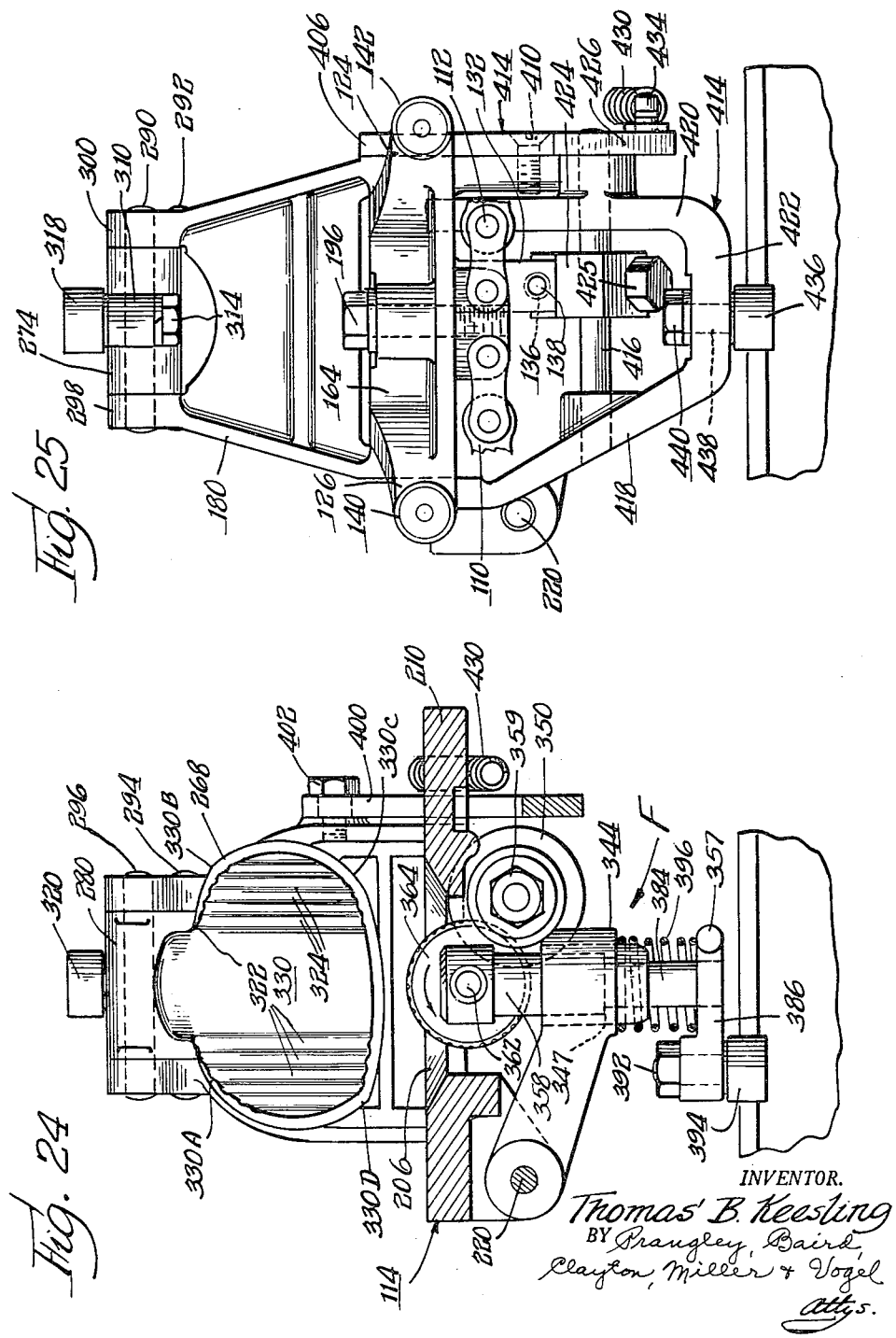

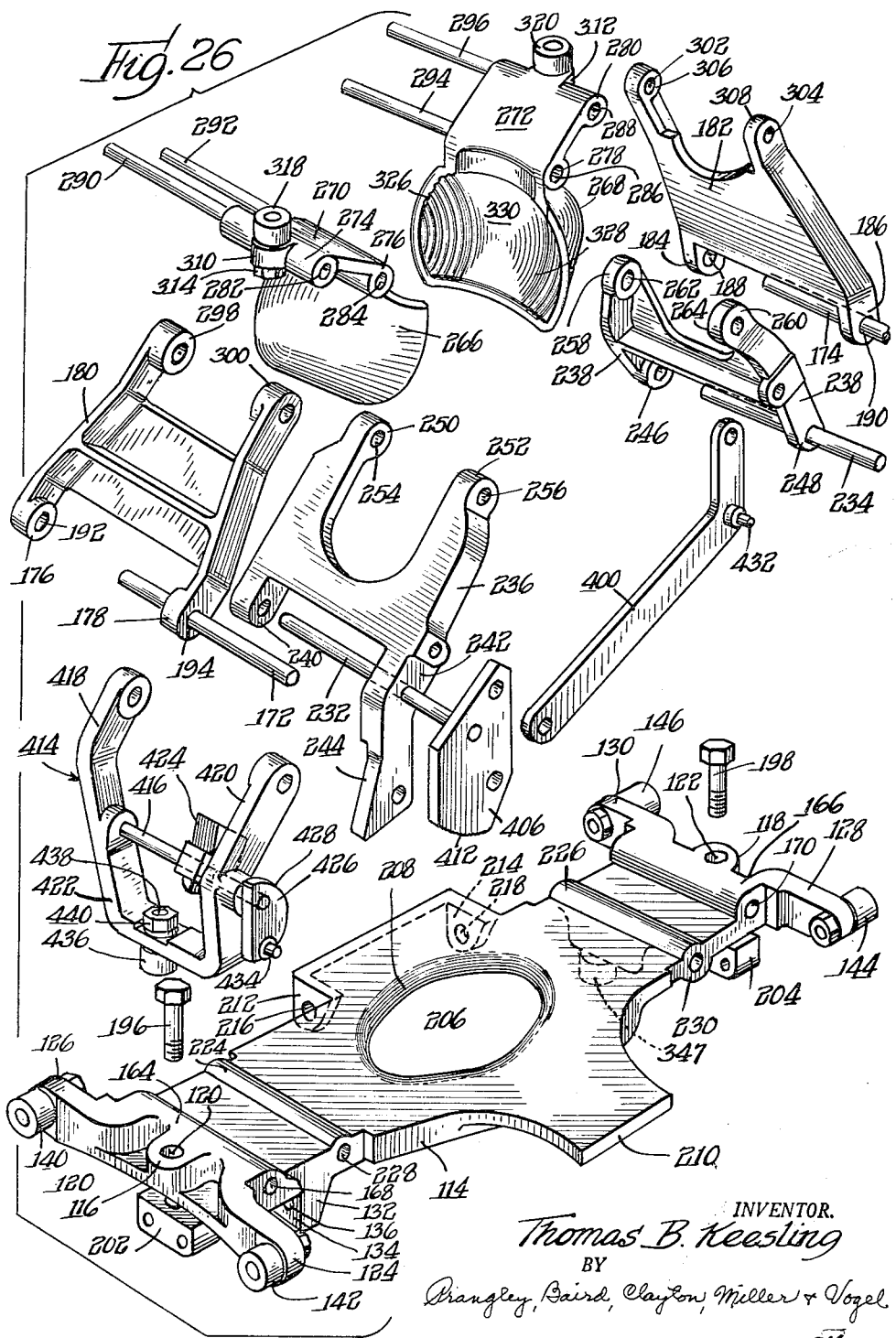

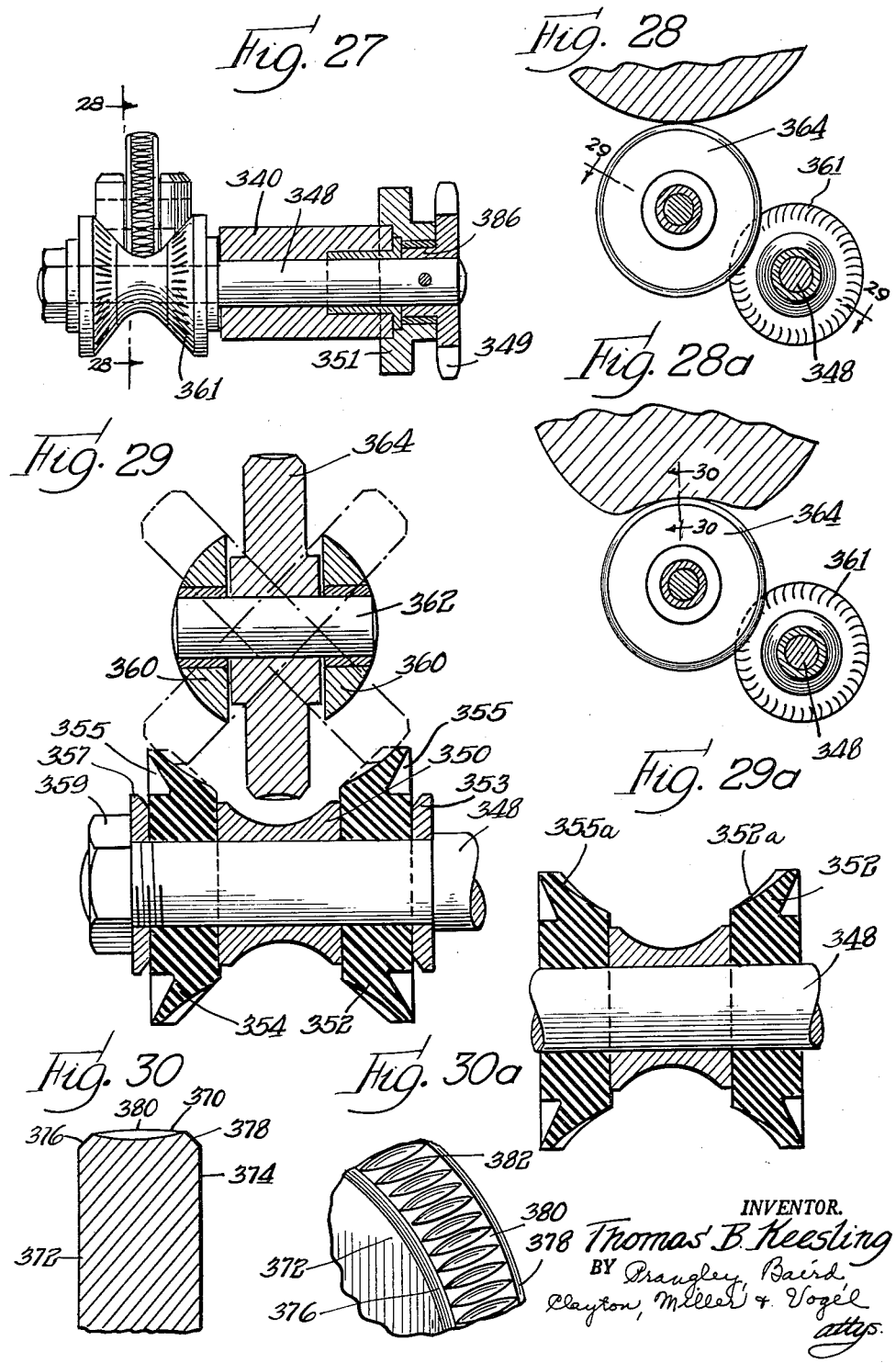

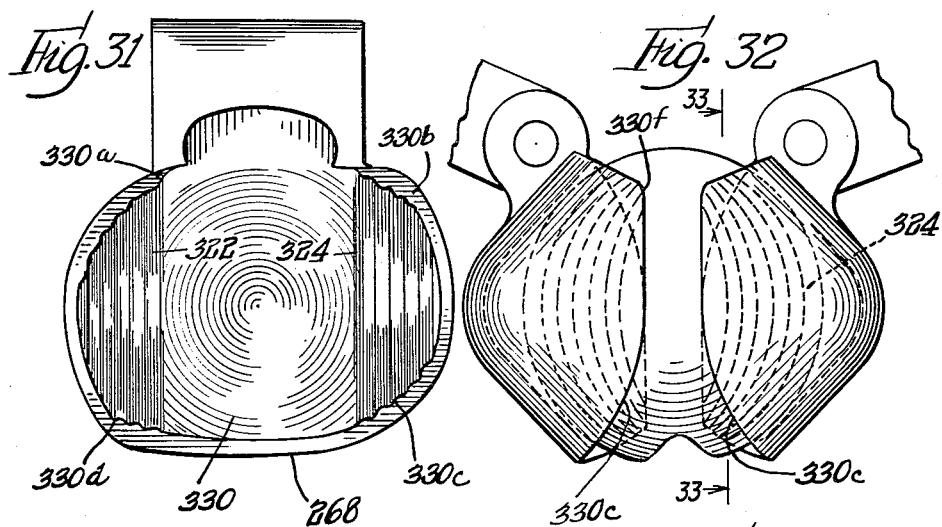
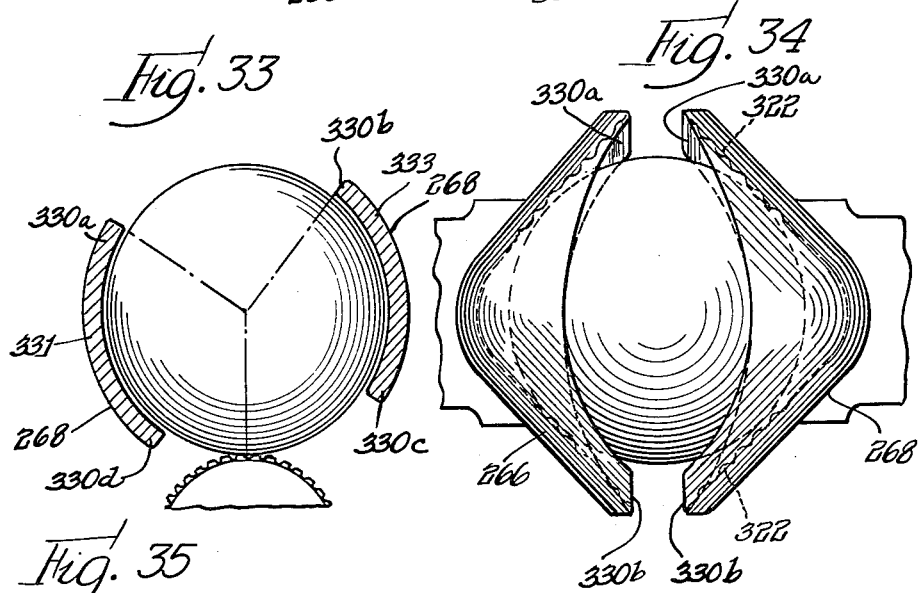
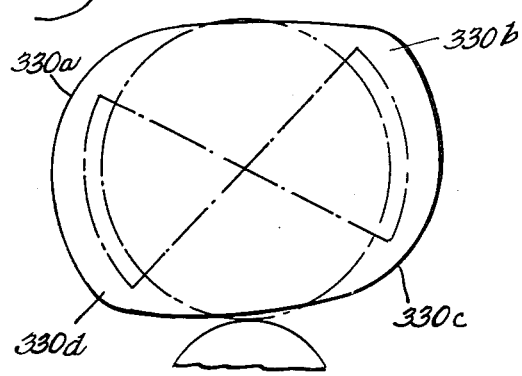

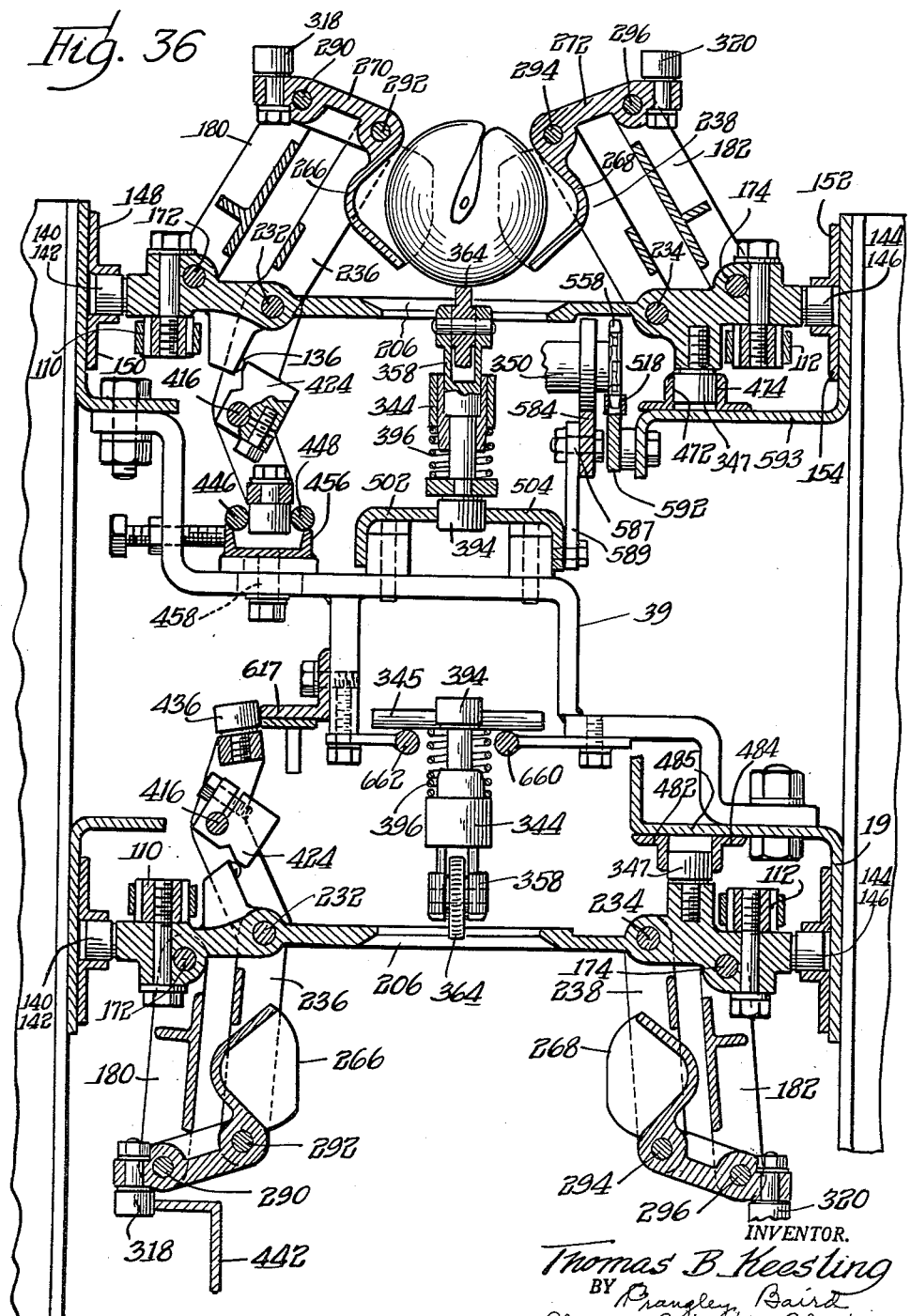

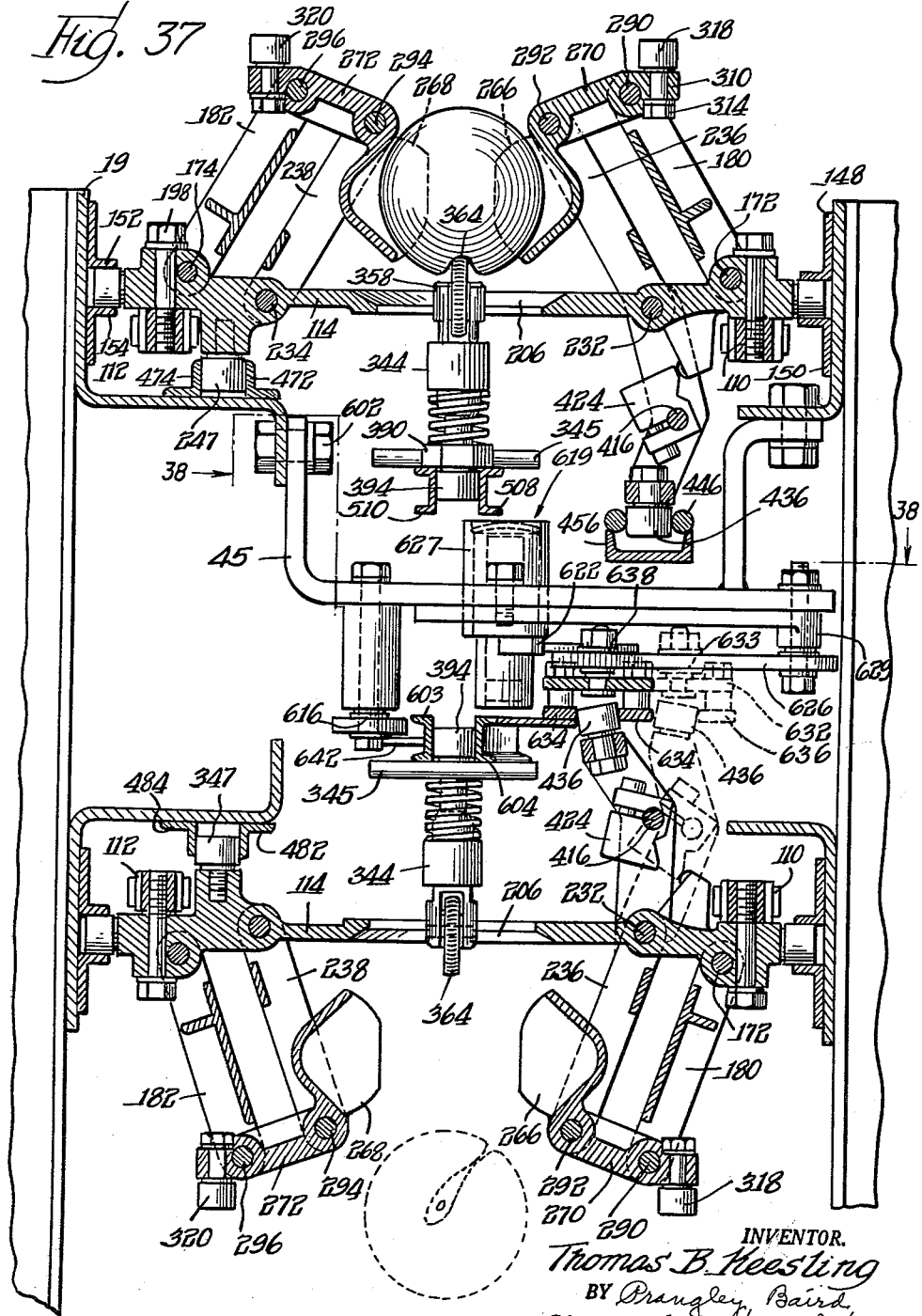

April 23, 1963     T. B. KEESLING     3,086,638
FRUIT PREPARATION MACHINE
Original Filed March 3, 1953     25 Sheets-Sheet 23
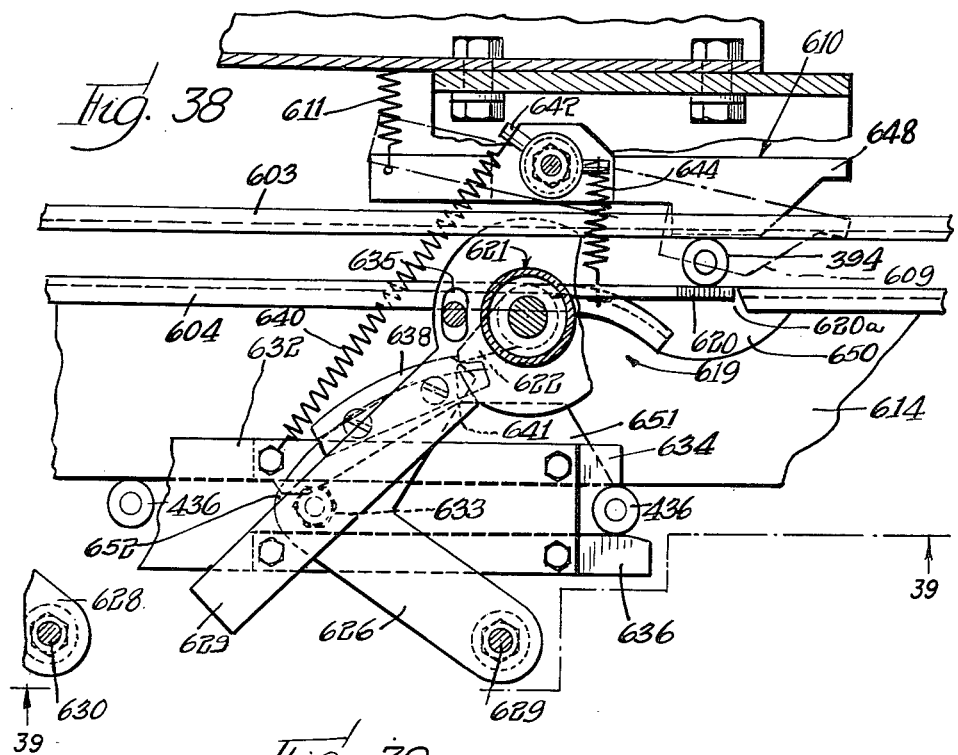
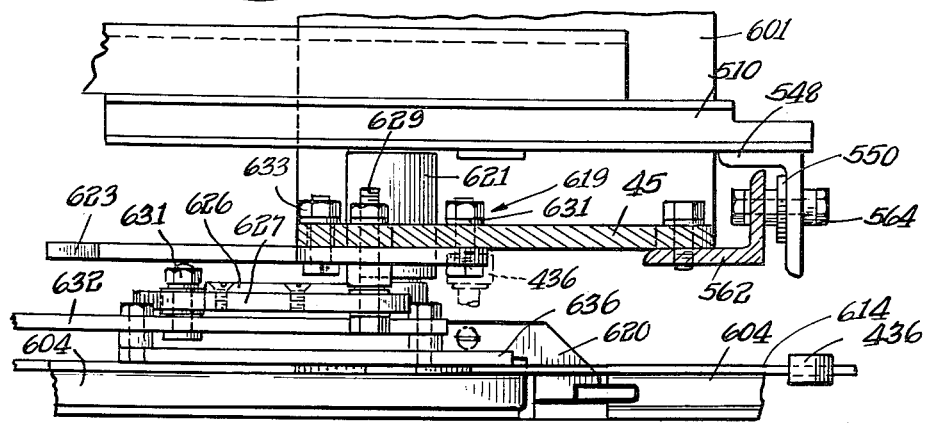
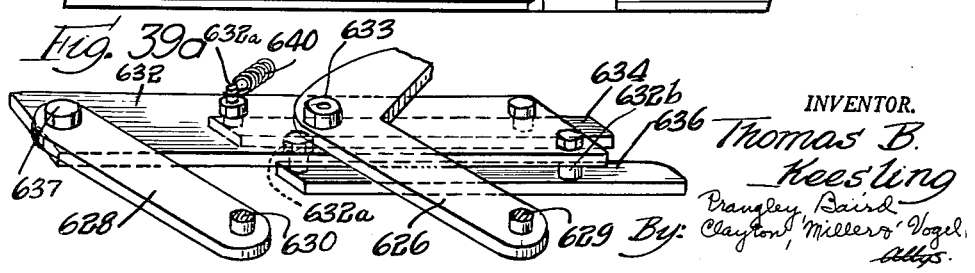
INVENTOR.
Thomas B. Keesling

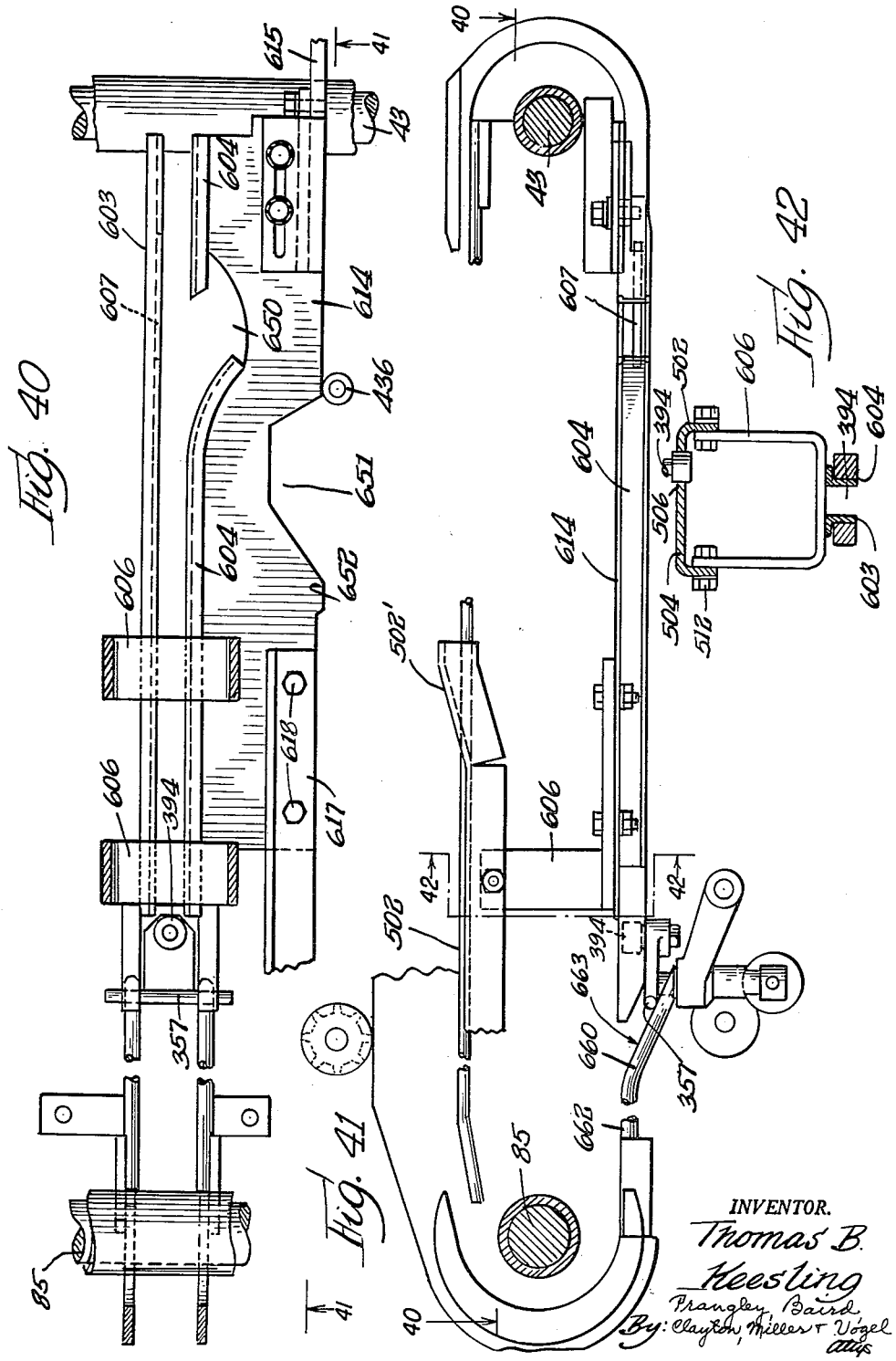

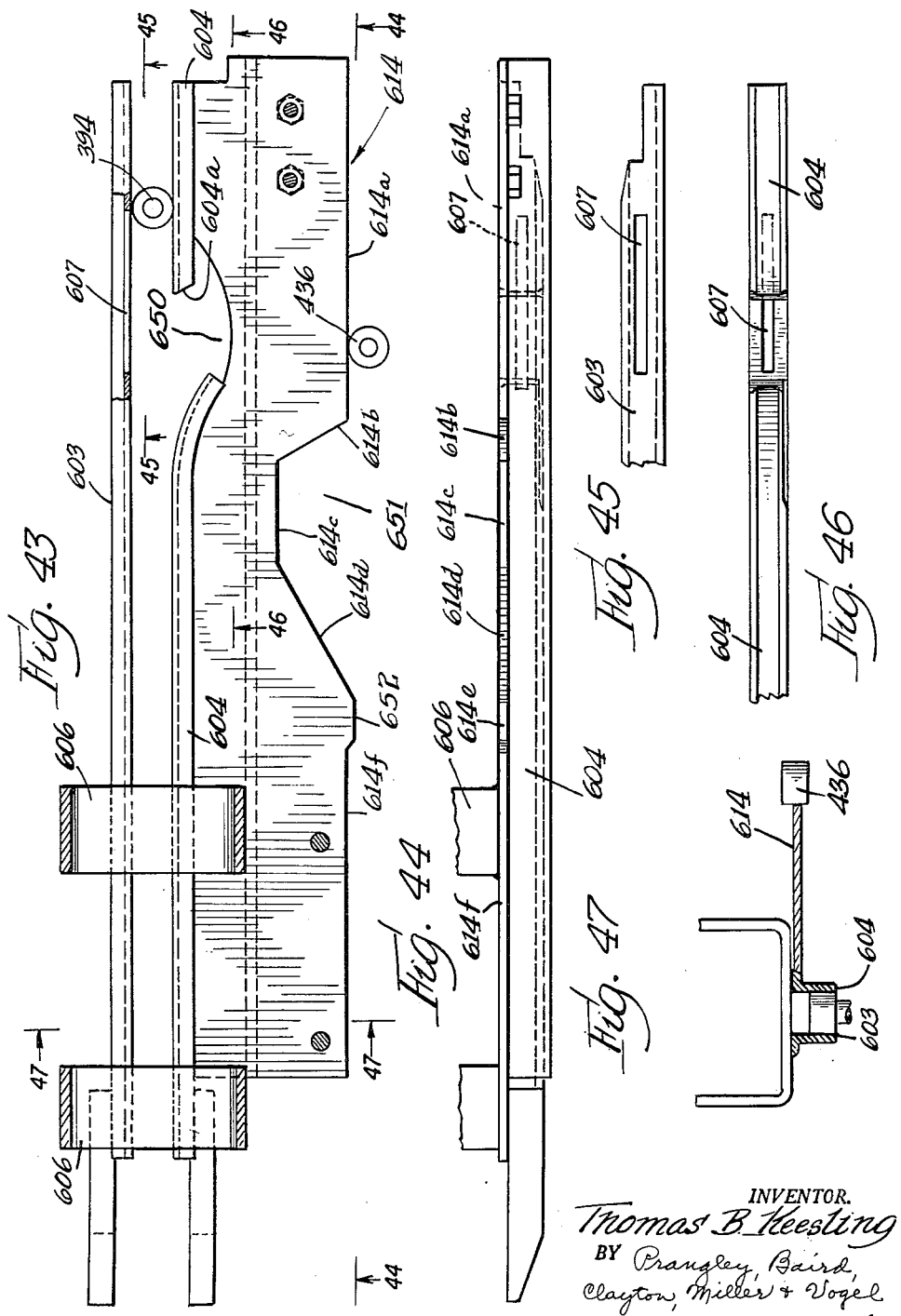

United States Patent Office 3,086,638
Patented Apr. 23, 1963

3,086,638
FRUIT PREPARATION MACHINE
Thomas B. Keesling, Los Gatos, Calif., assignor, by mesne assignments, to Canning Equipment Co., Olympia, Wash., a corporation of Washington
Original application Mar. 3, 1953, Ser. No. 340,047, now Patent No. 2,918,098, dated Dec. 22, 1959. Divided and this application Dec. 17, 1959, Ser. No. 64,235
17 Claims. (Cl. 198—33)

This invention relates to an apparatus for orienting and for inspecting peaches and like fruit as to orientation.

This application is a division of application Serial No. 340,047, filed March 3, 1953, now Patent No. 2,918,098, issued December 22, 1959.

An object of the invention is to provide new and improved means for inspecting fruit, while it is traveling at a high rate, to determine whether the fruit has been properly oriented for feeding to subsequently effective fruit processing mechanisms, such as splitting and pitting mechanisms.

A more specific object of the invention is to provide in a fruit orienting machine in which the fruit is carried by a continuous or endless conveyor and is oriented as to indent or suture plane as the fruit is carried along the upper reach of the endless conveyor means by which the fruit thereafter is inspected as to orientation while being carried along the lower reach of the endless conveyor and also in which improperly oriented fruit is discharged by gravity from the machine while it is being carried along the lower reach of the endless conveyor.

Other and further objects of the invention are to provide new or improved means for confining the whole fruit on fruit rotating and orienting wheels in such manner as to permit substantially free rotation of the fruit upon the rotation of said wheel; to provide in a fruit orienting mechanism fruit holding or confining means, cups or clamps which are movable between closed fruit gripping positions and partially opened positions in which the holding means is spaced from the confined fruit a predetermined distance which is uniform regardless of the size of the fruit in the holding means; to provide in an orienting machine or mechanism new or improved fruit holding means or clamps for centralizing the fruit in both vertical and horizontal planes and with respect to an orienting member or wheel; to provide new and improved fruit holding cups or clamps confining the whole fruit in engagement with an orienting member or wheel by which the fruit is rotated and constructed to facilitate the free and continuous turning of the fruit by the orienting member or wheel; to provide in a fruit orienting machine a continuously moving endless conveyor having a plurality of fruit receiving carriages each supporting an orienting unit including a rotatable member or wheel and means for continuously rotating said member or wheel about a horizontal axis during a predetermined portion of the path of conveyance of the carriages by the endless conveyor; to provide in an orienting machine new and improved fruit receiving and holding carriages; to provide new and improved means for feeding fruit into a continuous fruit orienting machine in such manner that each fruit receiving carriage of the orienting machine is supplied with a whole fruit and the machine thereby operated at all times at substantially full capacity; to provide a fruit orienting machine or mechanism in which the fruit orienting member is employed as an orientation sensing member for inspecting the fruit as to orientation and controlling mechanism for ejecting, or permitting the ejection of, improperly oriented fruit from the machine or mechanism; to provide fruit orientation inspection means employing a turnable sensing member engageable with the fruit and means responsive to the resistance offered by the engaged fruit to the turning of said member to control the operation of a fruit discharging mechanism, and to provide new and improved means for mounting fruit orienting units upon a series of fruit receiving carriages, clamps or cups so as to effect the withdrawal of the orienting units from orienting positions in engagement with the fruit to permit splitting and pitting of the fruit without interfering with the movement of the fruit carriages, clamps or cups at a constant, uniform high rate of speed.

These and other objects and advantages of the invention will be evident from the following description when taken in connection with the accompanying drawings wherein:

FIGS. 1 and 1a are related views in vertical elevation of a machine embodying the present invention;

FIG. 2 is a view in elevation of the opposite side of the machine of FIGS. 1 and 1a, illustrating however only part of the device for feeding fruit into the machine;

FIG. 3 is a fragmentary plan view of certain guide tracks and camways forming part of the machine;

FIG. 4 is a view in vertical section taken substantially along the line 4—4 of FIG. 2;

FIG. 5 is an enlarged fragmentary view in horizontal section taken substantially along the line 5—5 of FIG. 2;

FIG. 6 is a plan view, partly in section, of the driving mechanism of certain fruit orienting units forming part of the present machine;

FIG. 7 is a fragmentary view in vertical section taken substantially along the line 7—7 of FIG. 6;

FIG. 8 is a view illustrating the development of a drive cam for oscillating certain fruit orienting, or orientation sensing, members, forming part of the present machine;

FIG. 9 is a fragmentary plan view taken generally along the line 9—9 of FIG. 2 with certain parts removed for purposes of illustration;

FIG. 10 is a fragmentary view in vertical section taken generally along the line 10—10 of FIG. 5;

FIG. 10a is a fragmentary view in vertical section taken along the line 10a—10a of FIG. 4;

FIG. 11 is a fragmentary view in vertical section taken along the line 11—11 of FIG. 9;

FIG. 12 is a fragmentary view in horizontal section taken generally along the line 12—12 of FIG. 11;

FIG. 13 is a fragmentary view in vertical section taken along the line 13—13 of FIG. 9;

FIG. 14 is a view in horizontal section taken along the line 14—14 of FIG. 13;

FIG. 15 is a view in horizontal section taken along the line 15—15 of FIG. 10a;

FIG. 16 is a fragmentary view, partly broken away, in vertical section taken along the line 16—16 of FIG. 6;

FIG. 17 is a fragmentary view in horizontal section taken generally along the line 17—17 of FIG. 10a;

FIG. 18 is a view in vertical section taken along the line 18—18 of FIG. 16;

FIG. 19 is a view in vertical section taken substantially along the line 19—19 of FIG. 16;

FIG. 20 is an enlarged fragmentary view in vertical section taken substantially along the line 20—20 of FIG. 10;

FIG. 20a is an enlarged fragmentary view in vertical section taken substantially along the line 20a—20a of FIG. 10;

FIG. 20b is an enlarged fragmentary view in vertical section taken substantially along the line 20b—20b of FIG. 10;

FIG. 21 is a view in horizontal section taken along the line 21—21 of FIG. 20a;

FIG. 22 is a view in perspective of a fruit orienting unit forming part of the present machine;

FIG. 23 is a view in exploded perspective of the unit of FIG. 22;

FIG. 24 is a view in vertical section taken along the line 24—24 of FIG. 20a;

FIG. 25 is a view in elevation looking along the line 25—25 of FIG. 20a;

FIG. 26 is a view in exploded perspective of a fruit transporting unit forming part of the present machine;

FIG. 27 is an enlarged view in vertical section taken generally along the line 27—27 of FIG. 22.

FIG. 28 is a view in vertical section taken along the line 28—28 of FIG. 27, but illustrating a fragment of a peach in engagement with the orienting wheel unit;

FIG. 28a is a view similar to FIG. 28, but illustrating the relative position of the fruit and wheel after orientation;

FIG. 29 is an enlarged view in section taken along the line 29—29 of FIG. 28;

FIG. 29a is a view in vertical section illustrating a portion of the mechanism shown in FIG. 29;

FIG. 30 is a fragmentary view in vertical section taken along the line 30—30 of FIG. 28a;

FIG. 30a is a fragmentary view in perspective of a fruit orienting wheel, or suture sensing member, forming part of the fruit orienting unit;

FIG. 31 is a view in elevation of a fruit receiving or restraining member, or receptacle half, forming part of the present machine;

FIG. 32 is a fragmentary view in elevation illustrating the manner in which the fruit receptacles grip the fruits;

FIG. 33 is a fragmentary view in vertical section taken generally along the lines 33—33 of FIG. 32;

FIG. 34 is a plan view illustrating the gripping of a fruit in the fruit receptacle;

FIG. 35 is a diagrammatic illustration of the fruit receiving or restraining receptacle half;

FIG. 36 is an enlarged view in vertical section taken substantially along the line 36—36 of FIG. 2;

FIG. 37 is an enlarged view in vertical section taken generally along the line 37—37 of FIG. 2;

FIG. 38 is a fragmentary view in horizontal section taken substantially along the line 38—38 of FIG. 37;

FIG. 39 is a view in elevation looking along the line 39—39 of FIG. 38;

FIG. 39a is a detail perspective view of part of the inspector mechanism;

FIG. 40 is a view in horizontal section taken generally along the line 40—40 of FIG. 41;

FIG. 41 is a view in elevation, partly in section, looking along the line 41—41 of FIG. 40;

FIG. 42 is a fragmentary view in vertical section taken along the line 42—42 of FIG. 41;

FIG. 43 is a fragmentary view of an inspector mechanism control track, forming part of the present machine;

FIG. 44 is a view in elevation looking substantially along the line 44—44 of FIG. 43;

FIG. 45 is a fragmentary view in vertical section taken substantially along the line 45—45 of FIG. 43;

FIG. 46 is a fragmentary view in vertical section taken substantially along the line 46—46 of FIG. 43;

FIG. 47 is a fragmentary view in vertical section taken along the line 47—47 of FIG. 43.

Referring now to the drawings in detail, a preferred embodiment of a machine constructed in accordance with the present invention comprises a main frame A, FIGS. 1, 1a and 2; a main drive mechanism or unit B, FIG. 1; a fruit feeding or supplying device or means C; main fruit conveying means or conveyor D, including a plurality of identical fruit receiving, clamping and transporting units or carriages E carrying fruit orienting units, devices or means F, FIG. 4, one for each of the fruit transporting units or carriages E; driving means G, FIG. 7, for the fruit orienting units F; common actuating means H, FIG. 15, for vibrating or oscillating the orienting units in succession; orientation inspecting mechanism J, FIG. 9; a fruit rejecting mechanism or means K controlled by the inspector mechanism J and controlling the opening of the fruit receiving units E to discharge fruit not properly oriented by the time it passes the inspector mechanism; fruit bisecting or sawing means L, FIGS. 1 and 2, for splitting the oriented whole fruit along its suture plane; fruit spreading means M, FIG. 2, receiving the fruit halves from the splitting or sawing means and moving the fruit halves and the clamps of the fruit receiving units E to a spread apart position as the units pass beyond the splitting or sawing means L, and pitting or deseeding means N, FIG. 2, receiving the fruit halves passing from the end of the spreading means and thereafter moving at the same rate as the moving fruit halves simultaneously to pit the fruit halves without interfering with the continuous movement of the fruit carriages, the fruit halves after pitting being discharged by gravity from the fruit carriages and deposited on a continuously moving belt conveyor (not shown).

*The Main Frame and the Main Driving Mechanism*

The main frame A of the machine comprises four angle bar uprights 10, 11, 12 and 13, FIGS. 1, 2 and 3, joined by lower angle bars 14, 15, 16 and 17, and by upper angle bars 18, 19, 20 and 21, FIGS. 1, 2 and 4. Front end main frame castings 22 and 23 (FIGS. 1 and 2) are bolted to the front uprights 10 and 13 and rear main frame castings 24 and 25 are bolted to the rear uprights 11 and 12. The side bars 14, 15, 16 and 17 are tied together by cross bars 26, 28, 30, 32 and 34 (FIGS. 1, 2 and 4). The front end castings are joined by a rigidifying brace 35, and the rails 18, 19, 20 and 21 are joined by brackets 36, 37 and 39 (FIGS. 2, 3 and 4). The side frame bars and end castings are also tied together by a shaft 41 (FIGS. 2 and 15), by a rear end cross shaft 43 (FIG. 2), and also by an inspector supporting bracket 45 (FIGS. 9, 10a, 15 and 37). As shown in FIG. 2, the channel irons 32 and 34 provide a rigid platform for the combined motor and gear unit 38. The high speed shaft M-1, FIG. 4, of this unit is driven at a preferred standard speed of 1800 r.p.m. and carries a pulley 38b. The other shaft M-2 of the motor is the slow speed shaft of the combined motor and gear unit 38 and supports and drives a small sprocket 40 (see FIG. 1), which in turn drives a roller chain 42, which in turn drives a large sprocket 44, which is part of a clutch assembly shown in FIGS. 1 and 4.

With respect to this clutch assembly, it will be seen that the large sprocket 44 is mounted on a plate 46 which has a hub 47 which is supported on a bushing surrounding the cross shaft 48. Mounted upon the sleeve 47 of the clutch plate 46 is a disk 49 which is provided with an annular shoulder 50 which receives the large sprocket 44. The disk 49 is bolted to the plate 46 by means of bolts 51. The plate 46 has attached to its opposite face by means of bolts 52 a friction plate 53 the free face of which engages the friction plate 54 which is keyed as at 55 to the cross shaft 48. A cross pin 56 locks the clutch disk 54 to a pinion 57. A shear pin 58 drivingly connects the sprocket 44 with the disk 46. This shear pin has a shearing strength such as to carry the normal load of the machine, but if something should go wrong, or some part should get stuck, or something in the machine should break and jam this extra load would shear off this pin, and thereby the power from the machine would be instantly disconnected, thereby saving many parts which might otherwise be broken.

Means for shifting the clutch parts between driving and released positions is shown particularly in FIGS. 1 and 4. To this end, a bracket 59 is bolted as at 60 to the lower part of the casting 22. This bracket in turn supports a clutch yoke 61 which is pivoted as at 62. The upper end of this yoke 61 is pivotally connected to a cross link 63 which in turn is pivoted as at 64 to the base 65 of a handle 66 which base in turn is pivoted at 67 to a bracket (not shown) on the casting 22.

The central portion 70 of the yoke 61 is provided with a pair of rollers (not shown) which engage the flange of a collar 72 slidably mounted on the cross shaft 48. This collar is urged inwardly by a spring 73. The opposite end of this spring is anchored against a hand wheel 74 keyed to the shaft 48 and the hand wheel is prevented from being disengaged from the shaft by a disk and bolt 76.

As shown in FIG. 1, a gear 84, meshing with gear 57, is fixed or attached to a sprocket 82 keyed to the shaft 85. This shaft 85 is one of the main shafts of the machine and provides the power for driving of the main fruit conveying means or chain conveyor D.

*Main Fruit Conveyor and Carriages*

Figure 20B:
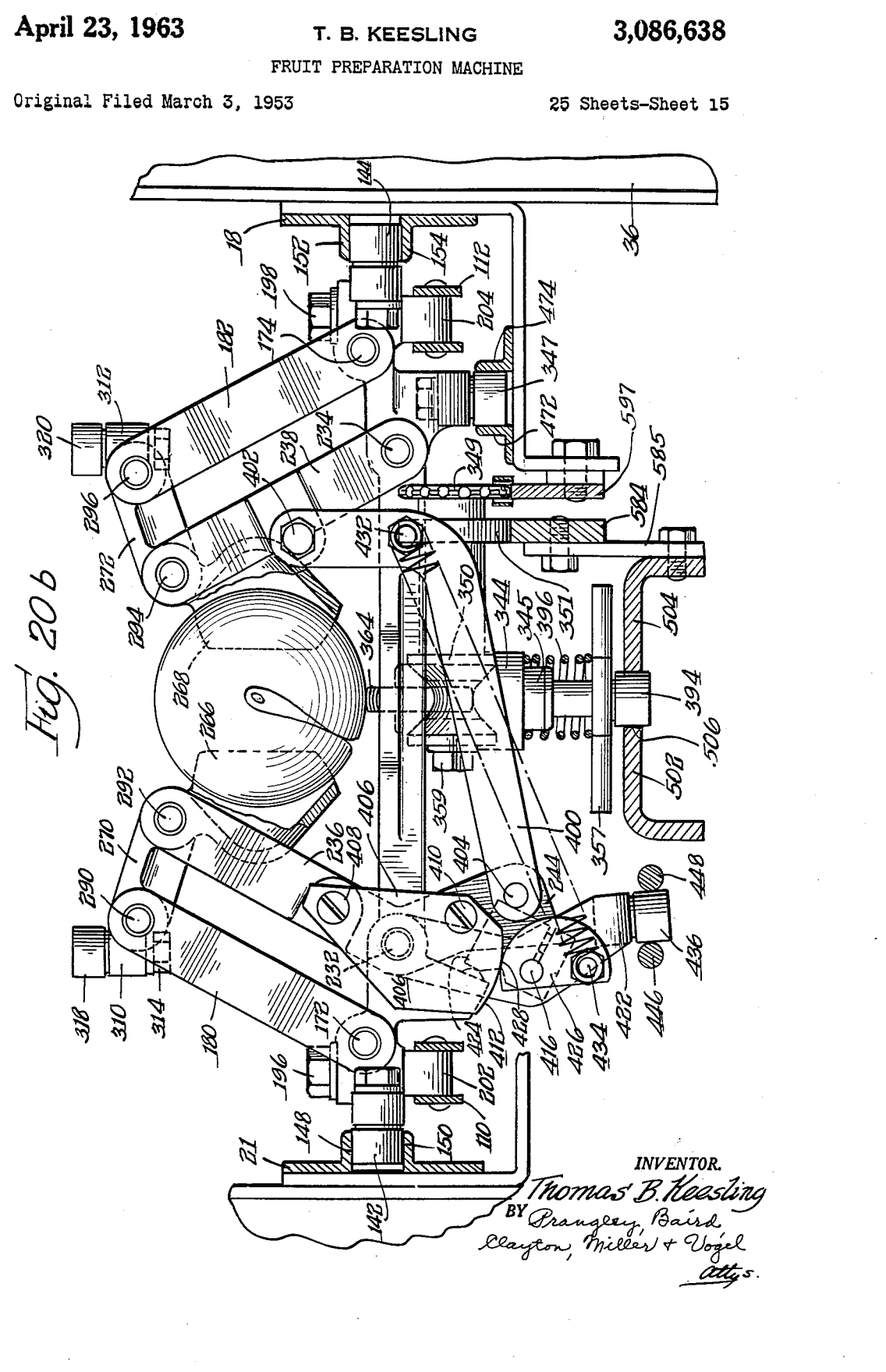

The main fruit conveying means or conveyor D comprises, as best seen in FIGS. 1, 4, 5, 20 to 20b, 36 and 37, parallel endless chains 106 and 108, passing at the forward end of the machine about drive sprockets 110 and 112 secured to the main drive shaft 85 and at the rear end of the machine about sprockets 113 and 115 journaled on cross shaft 43. Since the shaft 85 is driven continuously at a uniform, constant rate whenever the main clutch is engaged, the conveying chains 106 and 108 are driven continuously at a constant, uniform rate.

The fruit receiving, clamping, and transporting units or carriages E comprise a plurality of identical units spaced the same distance one from another throughout the entire length of the conveying chains 106 and 108, as best seen in FIGS. 1 and 2.

Each such unit or carriage comprises, as best seen in FIGS. 4, 10, 10a, 20, 21, 24 to 26, 36 and 37, a plate-like member or base plate 114, best seen in FIG. 26. At its opposite ends this generally rectangular plate 114 is provided with vertical bosses 116 and 118 having openings 120 and 122 and outstanding arms 124, 126, 128 and 130. One end of the plate 114 is also provided with a depending lug 132 provided with a threaded hole 136 to receive an adjustable stop pin 138 (see FIG. 25) for a purpose presently to appear. The arms 124, 126, 128 and 130 provide supports for the carriage guiding and supporting rollers 140, 142, 144 and 146 journaled on pins bolted to the arms 124 to 130, inclusive. The rollers 140 and 142 of the carriages upon the upper reaches of the chains are guided between upper tracks 148 and 150 (see FIG. 20) bolted or otherwise secured to the rail 21 on one side of the machine and the opposite set of rollers 144 and 146 are guided between the upper tracks 152 and 154 similarly secured to the rail 18. In a similar manner, the guide rollers of the carriages on the bottom reach of the two chains are guided and supported in the lower tracks 156 and 158 secured to the rail 23 on one side of the machine and the lower tracks 160 and 162 secured to the rail 19 on the other side of the machine. As the carriages pass about the front end sprockets 110 and 112, FIG. 5, the guide rollers 140 and 142 move along an arcuate guideway 163 formed in the end casting 23 while the rollers 144 and 146 move along an arcuate guideway 165 in the end casting 22. Similar arcuate guideways are formed in the rear end castings 24 and 25 to guide the rollers 140 to 146 as the carriages pass about the rear end sprockets 114 and 115. The only points at which these rollers are not totally confined in the tracks are above and below the centers of the end sprockets. At these two places, it is necessary to offset the outer tracks because of the fact that the pair of rollers on each side are spaced apart four inches or more, two inches on either side of the center of the plate 114, and unless the tracks were offset the leading roller of the pair would cause the rear roller to bind in the track as the leading roller passes into or from an arcuate track and from or into a straight track.

Portions 164 and 166 (FIG. 26) adjacent the opposite ends of the plate are bored as at 168 and 170 to receive pivot rods or pins 172 and 174. The rod 172 passes through the openings 192 and 194 of bosses 176 and 178 of a double-link frame 180, and the opposite double-link frame 182 is provided with a pair of similar bosses 184 and 186, suitably bored as at 188 and 190 to receive the rod 174. In this manner the two links 180 and 182 are pivotally mounted upon the opposite ends of the plate 114.

The openings 120 and 122 in the two end lugs 116 and 118 receive the shanks of vertically extending bolts 196 and 198 (see also FIG. 20). The bolt 196 threads into a threaded opening 200 in a block 202 attached to the chain 108. In a similar manner, the bolt 198 passes through the hole 122 in the lug 118 and threads into a block 204 attached to the chain 106.

The plate-like support 114 is provided with a substantially oval central opening 206 which has an upwardly and outwardly bevelled peripheral surface 208. In addition, plate 114 is provided with a forwardly extending carriage-spacer portion 210. Opposite this extension each plate 114 is provided with a pair of depending ears or lugs 212 and 214. These ears are perforated as at 216 and 218 for the purpose of receiving a mounting rod 220 (see FIGS. 10, 22, 24 and 25) for a fruit orienting unit F, hereinafter described.

Each supporting plate 114 is also provided with a pair of spaced apart elongated bosses 224 and 226 which are bored as at 228 and 230 to receive rods 232 and 234 (FIG. 26). These rods 232 and 234 form pivot supports for another pair of double-link frames 236 and 238 provided with perforated lugs 240, 242, 246 and 248, lug 242 being provided with an elongated extension 244. The link frame 236 is also provided with a pair of spaced arms 250 and 252, perforated as at 254 and 256. In a similar manner, the link frame 238 is provided with a pair of parallel arms 258 and 260 perforated as at 262 and 264.

The link frames 180, 182, 236 and 238 form mounting means of a pair of whole fruit receiving clamps, cups or receptacles composed of individual cup sections 266 and 268, best seen in FIGS. 20, 21, 24, 26 and 31 to 37, and hereinafter described in detail. These clamps, cups or cup sections 266 and 268 are provided with integrally extending arms 270 and 272. These arms extend backwardly from the mouth or edges of the cup sections at an angle of 20°. As seen in FIG. 26, the arm 270 has a pair of elongated parallel bosses or sleeves 274 and 276 and the arm 272 is provided with parallel bosses or sleeves 278 and 280. These sleeves are bored as at 282, 284, 286 and 288 to receive pivot pins 290, 292, 294 and 296. The pivot pin 290 is received in a pair of spaced perforated ears 298 and 300 of the link frame 180. In a similar manner, the pivot pin 292 is received in the two lugs 250 and 252 of the link frame 236. Correspondingly, the pivot pins 294 and 296 are received in the openings 262 and 264 of the bosses 258 and 260 of link frame 238 and the perforations 302 and 304 of the bosses 302 and 308 of the link frame 182. In this manner, there is provided two pairs of parallel links or link frames for each cup section, so that the cup sections will always lie in the same vertical plane as they are moved toward and from each other to receive, clamp, and release the fruit. It should be noted that the plane of the axes of the upper pivot pins 290 and 292, or 294 and 296, is parallel to the plane of the axes of the lower pivot pins 172 and 232, or 174 and 234, and inclined to the plane of the plate 114 so that the cup sections approach and recede from the plane of the plate in accordance with the size of the fruit inserted between the cup sections.

The arms 270 and 272 are provided with vertical bosses 310 and 312 perforated to receive bolts 314 and 316, carrying rotatable cup control rollers 318 and 320 which are operated by certain cam tracks as hereinafter described.

The clamp or cup section 268 (see particularly FIGS. 21, 24, 26 and 32) is provided in its side walls (which are straight in vertical section and straight in horizontal section) with a series of substantially vertically extending spaced grooves forming ridges such as 326 and 328, the opposite clamp or cup section 266 similarly having grooves forming ridges 322 and 324, to minimize resistance to turning of the fruit when desired and yet firmly grip the fruit when desired. The base or central portion 330 of each cup (which is curved in both vertical and horizontal section) is not provided with these vertical ridges or grooves, because the peach is not contacted by that portion of the peach clamps or cups, as shown by FIGS. 32 and 34. It will be noticed that each half cup is generally conical in form, so that regardless of the size of the peach received in the cups, the cups will centralize the fruit with respect to every horizontal plane through the apices of the confronting cup sections and with respect to the vertical midway between those apices.

The cups or clamp structures are further formed to assist in the orienting rotation of the peach therein, by minimizing cup-wall-resistance to turning of the peach, and for that purpose the uppermost corner or edge 330a (FIGS. 31, 33, 34 and 35) from which the surface of the peach recedes when under rotation, in a counterclockwise direction, as seen in FIGS. 31, 33 and 35, and from bottom to top in FIG. 34, is cut away or relieved both vertically and horizontally (or downwardly and inwardly) from the base edge of a true cone. It is also important that the uppermost corner 330b toward which the surface of the peach approaches when being rotated be unrelieved or be built up or protrude both vertically and horizontally (or upwardly and outwardly) from the base edge of a true cone.

The reasons for these two corners of the cup differing is that an unrelieved corner on the cup contacting the receding surface of a peach tends to bind the peach against rotation, but a low or relieved corner contacted by the approaching surface of the peach tends to cause the peach to slide or fall backwardly and downwardly and against the opposite wall of the cup thereby interfering with, or terminating, the free turning of the peach. For the same reasons, the lowermost corner of the cup diagonally opposite the corner 330a is relieved as at 330c and the lowermost corner diagonally opposite the corner 330b is unrelieved, or built up and caused to protrude as at 330d. It is to be borne in mind that the cups are used for a dual function. First, they are used to confine or control (but not to grip) the peach during its orientation rotation, and, secondly, they are used to center the peach, and also to grip the peach during orientation inspecting, sawing and pitting operations. Therefore, enough of the conical cup conformation must be retained and each individual cup is made substantially symmetrical so that any plane passing through the apex of the cup will contact surfaces of like conformation on either sidewall.

The extension 244 of the link frame 236 is interconnected with the link frame 238 by an L-shaped link or lever 400 pivoted to the link frame 238 as by stud bolt 402 and pivoted to the extension 244 by stud bolt 404. A lock plate 406 is mounted on the end of the shaft 232 and secured by bolts 408 and 410 to the link frame 236 of its extension 244. The lock plate is formed with a lower edge 412 in the form of a segment of a circle 412 concentric with the shaft 232.

A U-shaped casting or yoke 414 is journaled on the shaft 232. A shaft or pin 416 is journaled in the arms 418 and 420 of the yoke 414 in spaced relation to the bottom or cross bar 422 of the yoke. A split stop block 424 is adjustably clamped, by bolt 425, FIG. 25, to the shaft 416 between arms 418 and 420. The stop block is adapted to engage the pin 136 carried by the depending lug 132 of the base plate or carriage 114. A locking dog or cam plate 426 is secured to the outer end of the shaft 416 and is formed with a knurled peripheral edge in the form of a segment of a circle eccentric to the axis of the shaft 416. A coiled spring 430, FIG. 20a, is secured at one end as by a pin 432 to the L-shaped lever 400, approximately at the elbow of the lever, and the other end of the spring is secured to a pin 434 threaded into the locking dog 426 adjacent its lower end and in spaced relation to the shaft 416. A cam roller 436 is journaled on a threaded mounting stud 438 which passes through the base 422 of the yoke 414 and is secured thereto as by the nut 440.

Referring to FIG. 20a, it will be noted that a roller 347 is supported on a pin 359 and attached to a depending lug 361 (FIG. 20) by a nut 363 (FIG. 20a), the lug 361 being an integral part of the base plate 114. The purpose of this roller 347 is to maintain the fruit carriages against side-to-side movement. This roller runs in a pair of opposed spaced apart tracks 472 and 474 (FIGS. 5, 9 and 20a) mounted upon a bracket 476, which is in turn attached to the rail 18 of the main frame of the machine. These tracks extend longitudinally of the machine from the point 478 (FIG. 5) to 480 (FIG. 9) at the level of the upper reach of the conveyor chains. A lower pair of tracks 482 and 484 (FIG. 36) are mounted in spaced relation on a bracket 485 secured to the side rail 19. This lower pair of tracks start and stop at approximately the same points as the upper tracks 472 and 474. The roller is confined against lateral movement as the carriage moves around the end sprockets by flat plates 486 (FIG. 5) and 488 (FIG. 9), the plate 486 being mounted on a sleeve 490 (FIG. 5) surrounding the shaft 85 and is attached thereto by a pair of bolts 492 to an upright extension 494 which is welded to the sleeve 490. Similarly, the flat plate 488 is attached to a sleeve 496 (FIG. 9) which surrounds the shaft 43, a pair of bolts 498 attaching the plate 488 to an upright extension 500 which is welded to the sleeve 496. The plates 486 and 488 cooperate with the guides 452 and 615 which hold the rollers 436 against inward movement, as the carriages pass about the end sprockets, thereby to prevent side-to-side movement of the carriages.

The cup control roller 318 is operated or controlled by a cam track 442 (FIGS. 1, 2, and 5) and both that roller and cup control roller 320 are operated by certain auxiliary cams or pressure pads, later to be described. The cam track 442 is secured at its upper end to a bracket 443, FIG. 2, mounted on the head casting 23 and extends around the end and underside of the casting, in spaced relation thereto, to a point substantially in the plane of the front legs 10 and 13 where it is secured to any convenient bracket or plate (not shown) carried by the leg 10 or the side rail 14.

The roller 436 also serves as a cup control roller and is guided and controlled by a series of camming and guiding tracks. At the front end of the machine the roller 436 is guided and held in outward, cup-open, position by the segmental guide or cam track 452 (FIG. 5) mounted by bolts 454 on a radial arm of the stationary sleeve 490, the track 452 having at its upper end an inwardly inclined surface 455 (FIG. 5) permitting the roller to move inwardly in cup-opening direction. It may be here noted that while the roller 436 moves along the outer surface of the segmental guide 452 it does not prevent closing of the cups under the action of the spring 430, the cups being free to move inwardly when the roller 318 leaves the end of track 442.

From the end of the guide or track 452 the roller 436 passes into a guideway or trackway formed by guide rods 446 and 448 (FIGS. 5, 15, 20a, 20b, 36 and 37) welded or otherwise fastened to the flanges of a channel member 456 bolted to the cross straps 36, 37 and 39 (see FIG. 36). The rod 446 has at its forward end an inclined cam portion 444 (FIG. 5) which forces the roller 436 inwardly to move the cups in a cup-opening direction. The guide rod 448 extends from the front guide 452 to the segmental guide 615 (FIG. 15) mounted on the stationary sleeve 496 upon the shaft 43. The guide rod 446 terminates at the point 462, in advance of the track 615, so that the roller 436 may be moved in a cup-closing direction by an inclined cam surface 574 formed at the front end of the arcuate guide 615. As the cup carriages are carried by the lower reach of the chains from the rear end to the front end of the machine, the rollers 436 pass along other fixed, and movable tracks, later to be described, which move, or limit, the movement of the rollers to control the opening or closing of the cups and limit their inward movement, in the absence of the peaches in the cups.

*Orienting Units*

Each orienting unit F comprises, as best seen in FIGS. 22, 23 and 24, a mounting frame 222 swingingly and pivotally mounted on the pivot pin 220 passing through the lugs 212 and 214 depending from the base plate 114 as shown in FIGS. 21 and 26. The orienting frame 222 comprises a carriage plate 334 provided with an integral arm 338 formed on its free end with a sleeve-like horizontal boss 340 having a perforation 342. In addition, the plate 334 is provided with a vertical boss 344 having an aperture 346. The boss 340 receives a rotatable shaft 348 to one end of which is pinned a sprocket 349 and to the opposite end of which is pinned a driving spool 350 of the general conformation of an hourglass having opposed driving cones 352 and 354.

In boss 344 is mounted a bushing 345 in which a spindle 358 is journaled, the shaft portion 358 of the spindle being split, as at 360, at its upper end to receive a cross pin 362 upon which is free to rotate an orienting wheel 364. By reference to FIGS. 27 and 30a, it will be seen that the wheel has a curved or rounded edge as at 370, has parallel sides 372 and 374 which at their outer edges merge into opposed annular bevelled surfaces 376 and 378. These bevelled surfaces in turn merge into the central arcuate edge or peripheral surface 370. The peripheral surface 370 is provided with spaced apart elongated-oval shaped notches 382 forming relatively shallow gear-like teeth on the periphery of the orienting wheel.

The spindle 358 has a reduced portion 384 (FIGS. 23 and 24) to which is rigidly secured an arm 386 carrying at one end a transversely extending cross bar 357. At the opposite end, the arm 386 is provided with a block-like portion 390 which is perforated to receive a threaded stud secured to the block by a nut 392. The stud carries a cam roller 394 which is free to rotate on the stud. The bushing 345 is provided with an internal annular shoulder 347 (FIG. 24) forming a seat for the shoulder formed by the reduced portion 384 of the roller orienting wheel spindle 358 to limit the relative downward movement of the spindle. The bushing 345 projects below the boss 344 and forms a guide for a coiled spring 396 confined between the boss and the plate 386 and urging the orienting wheel downwardly so as to maintain it in engagement with one of the driving cones 352 and 354.

The shaft 348, heretofore described, is journaled on the boss 340, and in addition to the sprocket 349 has at its outer end a roller 351 which is journaled on the boss 340 and journals the hub of the sprocket. At the opposite ends of the sleeve or ring 350 is mounted the cone shaped neoprene rubber driving members 352 and 354. The driving cone 352 is seated against a metal conical washer 353 which bears against a shoulder on the shaft 348 and against the hourglass sleeve 350. The driving cone 354 abuts the opposite end of the metal sleeve 350 and both cones are clamped on the shaft and forced into gripping engagement with the shaft by a conical metal washer 357 and nut 359 on the threaded outer end of shaft 348. The cones are formed on their outer faces with annular grooves or conical recesses 355 to provide relatively flexible flanges supplying a more resilient contact between the bevelled or conical driving surfaces and the periphery of the orienting wheel 364. This construction insures that the true driving surface will remain in shape and position during continued use as hereinafter described.

When originally installed, these two rubber driving cones 352 and 354 are provided with smooth wheel driving surfaces, such as 361, but after usage the teeth or serrations 382 (see FIG. 30a) of the orienting wheel automatically, from repeated usage, form spaced intermeshing complementary teeth or serrations in the surfaces 361 of the driving cones 352 and 354, as shown in FIGS. 27 and 29a. Due to some inherent characteristic of neoprene, differing from that of rubber, these integral teeth are formed therein by the driving contact of the cones and the wheel and these teeth form in effect frictional driving teeth which cooperate with the driving teeth formed on the periphery of the orienting wheel to provide a more positive driving engagement between the orienting wheel and these two driving members. It should be noted that when the orienting wheel is at right angles to the axis of the shaft 348, the orienting wheel is out of driving contact with either of these two driving cones 352 and 354 and does not engage the central spool 350 of the orienting wheel when the wheel is so positioned.

Referring to FIGS. 22 and 23, it will be noted that the block 386, attached to the shaft 384 of the orienting wheel, is provided with a cross bar 357. This bar engages certain cam tracks (later to be described) extending longitudinally of the path of travel of the conveyor chain, and this cam track and bar function a means for raising the orienting wheel from driving engagement with the cones. At other times, the spring 396 resiliently urges the spindle 358 downwardly so as to hold the orienting wheel in position to contact the driving cones.

Roller 394, on orienting spindle 358, is adapted to engage in a cam slot 506 (FIGS. 3 and 5) formed by spaced complementary undulating tracks 502 and 504, the rollers 394 of the orienting units upon the upper reach of the chains moving along the cam slot as the fruit carriages E move from the front end to the rear end of the machine. These tracks are mounted, as by bolts 510 (FIG. 4) on the cross brackets 36, 37 and 39, and extend only along the upper reach of the conveyor chains. The cam slot 506 is open at its forward end, as shown in FIG. 8, where a roller 394 is just entering the cam slot. These cam tracks 502 and 504 automatically swing the orienting wheels 364 about the axes of the spindles 358 through angles of 45° and 90° as the wheels progress along the upper reach of the chains.

It is to be noted that the rear ends of the control tracks 502 and 504 are inclined upwardly as at 502' and 504' (FIGS. 9, 10a, 15 and 16) so as to engage the bar 357 of the spindle arm 386 and thereby raise the orientator wheel 364, for purposes which will later appear.

*Driving Means for the Orienting Units*

Thisc means for automatically rotating the orienting wheels of successive units includes a sprocket 580 (FIGS. 6, 15 and 16) keyed to shaft 48, the sprocket 580 driving a roller chain 581 to in turn drive a sprocket 582 (see also FIG. 19) which in turn drives a stub shaft 524 to drive a sprocket 520. The sprocket 520 drives a chain 518 which passes over a sprocket 514 on a shaft 516.

The shaft 516 is mounted in a boss 517, FIG. 18, of an arm 519 having a hub 521 pivotally mounted on a bushing 523 carried by a bolt 524 secured to a side plate 524a fastened to the side rails 18 and 19. A spring 525 is anchored to pin 527 secured to side rail 18 and to a set screw 529 carried by boss 517 which tensions the chain 518 and adjusts the sprocket 514. A spring urged locking member 531, carried by a bolt 533 passing through a slot (not shown) in a plate 535 secured to the end of the shaft 41, FIG. 15, and through a slot 537 in plate 524a, regulates the chain tension. The sprocket 514 is secured to the hub of a drum cam 530, FIG. 23, which is journaled by a suitable bearing on the shaft 516.

It should be noted that the opposite end sprocket 520 is secured to the hub of the sprocket 582, as shown in FIG. 19, which is journaled on the shaft 524. The shaft 524 is mounted on a bracket 537 adjustably bolted to the side rail 18.

The free running roller 351 mounted on the drive shaft 348 of the orienting wheel unit is guided upon a rail or track 584 (FIGS. 5, 6, 7, 10 20a and 20b) which is mounted upon plates 585 bolted to the track 584. The track 584 at its forward end merges into a track 591 having an inclined track surface 593, and the track 591 at the forward end converges into a segmental track 595, suitably mounted upon the stationary sleeve which surrounds the main shaft 85, the segmental track 595 having an arcuate guide surface for the free running roller 351. The track 584 terminates at its rear end at a point to the rear of a vertical plane through the axis of the shaft 516, as shown in FIG. 7.

The upper reach of the roller chain 518 is guided upon a track 597 which is adjustably mounted in a suitable manner so that the upper reach of the chain is elevated above the points at which the chain leaves the drive sprocket 520 and engages the sprocket 514 so that the chain is inclined upwardly from the sprocket 520 toward the track 597 and inclined downwardly from the track toward the sprocket 514. Thus, as the orienting wheel units approach the driving chain 518, the sprockets 349 are caused, by the inclined front end section of the chain, to mesh properly and without jamming with the links of the chain and similarly, as the orienting wheel units approach the end of the driving chain the sprockets disengage, without jamming, from the chain by reason of the downwardly inclined rear end section of the chain. The drive tracks 584, 591 and 595, acting on the free running rollers 351, assure the proper positioning of the sprockets 349 for this meshing and demeshing with and from the drive chain 518.

It will be evident that the sprockets 349 are caused to rotate during the time of engagement with the chain 518, both by reason of the movement of the orienting wheel units longitudinally of the chain and also by reason of the fact that the chain 518 is driven by the drive sprocket 520.

As each orienting wheel unit leaves the end of the driving chain, the orienting wheel spindle roller 394 approaches the end of the cam tracks 502 and 504 and the cross bar 357 of each orienting wheel unit engages the inclined sections 502′ and 504′ of the tracks 502 and 504, and the orienting wheel is thereby swung to a position parallel to the path of movement of the fruit carriages and simultaneously raised so that the further rotation of the orienting wheel is terminated not only by the disengagement of the sprocket 349 from the driving chain 518 but also by the action of the cam tracks 502 and 504 in disengaging the orienting wheel from the driving cone 352—with which it was last in engagement as the roller 394 moved along the last offset portion of the cam slot provided by the tracks 502 and 504.

*Orientation Inspecting and Fruit Rejecting Mechanisms*

The inspecting mechanism J, FIGS. 9, 10a, 11 to 13, 17, and 37 to 46, is mounted on the underside of the bracket 45 and attached to suitable brackets mounted upon the side bars of the machine, as by bolts 602 (FIGS. 9 and 35). A double track or guide made up of two channel irons 603 and 604 is secured to the underside of the bracket 45 by the bracket 605 (FIG. 10a) and likewise secured to the tracks 502 and 504 by brackets 606 (FIGS. 10a and 40 to 42). The track 603 has a horizontal slot 607 formed therein to allow the finger 609 of a gauge lever 610 to project into the path of the orienting rollers 394 on the bottom reach of the chain conveyor. A spring 611 is hooked to the opposite end of lever 610 and to an adjusting screw 612 projecting through the upright 12 and held by a wing nut 613. A plate 614, having surfaces 614a, 614b, 614c, 614d, 614e, and 614f (FIGS. 40 and 43), abuts the track 604 and is supported by bracket 45, and is secured to the segmental guide track 615 by the bolt 616 and to the guide track 617 by the bolts 618. A track gate and trigger assembly 619, FIGS. 11 and 12, is composed of a gate lever 620 having a stop projection 620a, a hub 621, and a hardened latch, dog or trigger 622. The hub 621 is secured to a pin 623 journaled by ball bearings 625 in a housing 627 having an adjusting handle 629 welded to it.

The housing is adjustably secured to the under side of the bracket 45 by a pivot bolt 631 and a locking bolt 633 passing through a slot 635 in the handle 629.

A cup control assembly comprises a pair of links 626 and 628 (FIGS. 9, 10a, 17, and 37 to 39a) pivoted, by suitable ball bearings, on studs 629 and 630 secured to the bracket 45. The opposite end of the link 628 is pivoted on a stud 637 secured to a bar 632. The link 626 is L-shaped and pivotally mounted at its elbow on a stud 639 also carried by the bar 632.

Two track bars 634 and 636 are mounted on the bar 632 by bolts 632a and spacers 632b (FIG. 39a). Due to the parallelogram mounting of the bar 632, the two tracks 626 and 628 carried thereby move inwardly in parallel alignment with the center line of the machine. The L-shaped link 626 has secured to its free end a hardened sear 638 having a notch 641 to receive the trigger 622.

The bar 632 and hence the tracks 634 and 636 are urged inwardly by a spring 640 (FIGS. 9, 14 and 38 and 39a) anchored on one of the bolts 632a and to a pin 642 secured to a sleeve 643, welded or otherwise secured to bracket 45 (see FIGS. 13 and 37).

The gate lever 620 is urged inwardly to track closing position, as shown in FIGS. 12, 17 and 38, by a spring 644 anchored by a pin 645 to the lever 620 and by a pin 646 (FIGS. 9, 13, 14 and 38) to the sleeve 643.

The sleeve 643 receives a pivot or stud bolt 645 on which the gauge lever 610 pivoted. The lever 610 has a camming face or edge 646 which causes the lever to be retracted when engaged by an orienting wheel-control roller 394 and an actuating face or edge 647 which engages the roller 394, when the roller passes beyond the camming edge, so that the roller 394 is subjected to the force of the spring 611 tending to urge it in a lateral direction and also to the force of the spring 644 tending, through the gate lever 620, to resist movement of the roller in that direction. The lever 620 is also formed with a stop portion or nose 648 which is adapted to engage the side of the track 603 to limit the clockwise movement of the lever, as shown in FIG. 38.

The track 604 is formed with an outwardly curved cam portion 649 to be engaged by an outwardly moved roller 394 and return it to the guideway formed by the track 603 and the portion of the track 604 beyond the roller-escape opening 650 in said track.

It should be noted that the plate 614 provides a guide surface 614a for the roller 436 when it leaves the bottom of the segmental guide track 615, and that the opening 651 in the plate 614, formed by the surfaces 614b, 614c and 614d, permits the inward movement of the roller 436, under the action of the spring 640, when the tracks 634 and 636 are moved inwardly. A cam projection 652 on the track 614 moves the roller 436 outwardly at a proper time to reduce the trigger-sear friction between the trigger 622 and sear 638.

As the roller 436 approaches the end of plate 614 it engages a guide track 617 (FIGS. 4, and 36) bolted to the plate 614 and other suitable brackets such for example as illustrated in FIG. 36, the track 617 extending to the front end of the machine and meeting the lower end of the segmental track 452.

*Operation of the Machine*

When the clutch is engaged, as hereinbefore described, the combined electric motor and gear unit 38 drives the endless chains uninterruptedly so as continuously to progress the spaced series of fruit carriages E, carried by the endless chains, first along the upper reach of the conveyor, thence around the rear end sprockets, thence along the lower reach of the conveyor, and thence around the front end sprockets and then again along the upper reach of the conveyor, in endless fashion. The fruit feeding means C deposits the fruit in individual succession and in position upon the carriage plate 114, as shown in FIG. 10, and between a pair of opened clamps or cups 266 and 268, the fruit being approximately centered between the cups by the opening 206 in the feed tray or plate 114, as shown in FIG. 20. The contact of the whole peach with this centralizing hole 208 of the plate 114 is but momentary, lasting somewhere between 1/60 and 1/5 of a second before the roller 318 is allowed to move in a cup-closing direction by the cam track 442 so that the cups are snapped together to grasp the peach, the spring 430 moving the cups to that position (see FIG. 20a). The opening in the plate 114, in addition to having a substantially instantaneous peach centering function, also permits the orienting wheel mechanism to move through the plate to engage and raise the peach a distance of about 1/4" above the plate, and the peach does not thereafter as it moves through the machine contact the plate 114.

The raising of the orienting wheel is occasioned by the movement of the roller 351 along the inclined front end 593 of the track 591, see FIG. 7, and this raising of the wheel is so timed with relation to the closing of the associated cups that the fruit is lifted an instant before the cups close and the cups thereupon, as is previously described, center the fruit in the plane of the wheel and center the fruit horizontally and in proper engagement with the wheel. The roller 436 almost immediately contacts the front inclined end 444 of the track 446 (see FIG. 5) and the yoke 414 is thereby moved inwardly to move the cup to a fruit clearance position, as shown in FIG. 20b. The first increment of this inward movement causes the cam 426 to rotate anti-clockwise on shaft 416 and engage the lock plate 406. This is due to the eccentricity of the semi-circular cam member. This amount of movement has been predetermined by using a thickness gauge, or shim, of desired thickness, inserted between the cam 426 and the lock plate 406 when in unlocked position, to determine the angular setting of dog 424 on the shaft 416 necessary to engage the stop pin 138. It may be noted that each one of the multiple locking units on the conveyor chain is adjusted exactly alike. This adjusted, fixed extent of inward movement of the control roller 436 causes engagement of the cam with the lock plate, regardless of the spacing of the cups for different fruit sizes. The second increment of inward movement of the roller 436 and yoke 414 moves the opposed cups sufficiently away from the peach to provide between the peach and the cups a fixed, uniform clearance which is the same for all sizes of peach. This uniform clearance permits each peach to turn under the influence of the orienting wheel on which it is supported and is riding, so to speak. Peaches are substantially round, but not perfectly round, and insufficient clearance between a peach and the cup walls will prevent rotation of the peach because of the resistance between opposite portions of the peach and the cups. For instance, if the opposed cups contacted a peach on a smaller axis and the peach on being turned by the wheel would present a larger axis to the cups the cup walls would bind the peach against further rotation. On the other hand, an excessive clearance between the cups and the peach would permit the peach to fall sidewise off the orienting wheel and against the bottom lip of a cup and out of driving engagement with the wheel. The best orienting is accomplished when the peach is resting nearest to a vertical position directly over the rotating wheel 364 and confined in that position by the two halves of the cups but free for rotation without undue restriction by the cup walls. It is understood that the two halves of the cups do no grip the peach but merely act as a confining means for keeping the peach directly over the orienting wheel so that substantially all of the weight of the peach is borne by the wheel.

During the orienting period when the peach is positioned on top of the rotating orienting wheel, the cups are positioned in spaced relation from the peach to permit the peach freely to revolve on the orienting wheel between the cups, and the inner walls of the cups are shaped to prevent a binding of the peach between the inner wall surfaces of the opposed cups. However, in the majority of instances when during the rotation of the wheel the stem cavity of the peach registers with the upper rim of the orienting wheel, the peach may no longer be held free of the cups and the peach may lose its central relationship to the cups and may fall against the lower lips of the cups which provides a desirable resistance to turning so that when the orienting wheel is moved quickly through an angle of 90° about its vertical spindle-axis the orienting wheel moves relative to the peach until it registers with the long axis of the stem indent and the peach turns with the wheel about the vertical axis but is no longer rotated by the wheel about a horizontal axis. In these circumstances the suture plane is found quickly by the wheel.

After the cups have been moved to the fruit-clearing position the roller 394 reaches the first offset cam section of the tracks 502—504 (see FIGS. 3, 5 and 15) and the wheel is positioned at an angle of 45° to the path of the fruit carriages and simultaneously brought into engagement with a driving cone 352, or 354 (FIG. 29), so that the fruit is rotated in a plane at that angle to its path of conveyance.

Thereafter as the carriages and orienting units move along the upper reach of the conveyor, the orienting wheels are periodically swung about a vertical axis through an angle of 90°, first in one direction and then in the opposite direction, by the offset cam sections of the tracks 502 and 504 (see FIGS. 9 and 10). In the illustrated embodiment these tracks are formed with nine offset sections, the first of which swings the wheel to an angle of 45° to the vertical central plane of the machine, the last of which returns the wheel to a position parallel to, or in, said plane and the other seven of which cause the wheel periodically to zig-zag between positions at 45° to said plane.

During this period of rotation and zig-zagging of the wheel the fruit is, in substantially all, but not all, instances, brought into suture plane alignment with the wheel and the wheel penetrates to maximum extent into the stem cavity of the fruit. Immediately upon the completion of this rotation and zig-zagging of the wheel the driving mechanism G is automatically disconnected from the orienting wheel and the wheel is then lifted, by the cam surfaces 502' and 504' (FIGS. 10a, 15 and 16) of the tracks 502 and 504, approximately a distance of one half inch, thereby lifting the peach so that the axis of the fruit lies above the horizontal plane of the cup apices so that during the subsequent rapid oscillation of the fruit and wheel the fruit will be more closely confined, by the upper lips of the cups, and also so that as the cups are closed the cups will exert a downward force tending to keep the peach in alignment with the wheel.

As a fruit carriage carrying a peach therein approaches the rear end sprockets of the conveyor chains the cups are brought to a closed position firmly against the peach, and as the cups close the orienting wheel is allowed to drop a predetermined distance of substantially one-eighth inch to facilitate the re-centralizing of the fruit in the cups without affecting their orientation. Then, as the carriages start forwardly along the lower reach of the conveyor the cross bar 357 is forced downwardly by the rear end of the cam track 604 (FIG. 41) and the wheel is forced more firmly into the stem indent of the peach.

It should be noted that the cups are closed, by cam 574 (FIG. 15), to fruit gripping position as the roller 436 approaches the segmental guide 615 and the cam 426 moved out of engagement with the lock plate 406 so that the spring 430 applies a resilient, yielding, cup-closing force to grip the peach. At the time that the wheel is lowered by the rear end of lower cam track 604 (FIG. 41) it is of the utmost importance that the wheel be firmly locked into the stem indent of a peach properly oriented as to suture plane or held firmly into contact with a peach not properly so oriented.

As the fruit carriage reaches the inspecting mechanism J, the edge 609 of the gauge 610 is contacted by the roller 394 (see FIGS. 17 and 38) and the gate lever 620 is positioned in alignment with the track member 604 and the notch 641 in the sear 638 is engaged by the trigger 622. When a peach is properly oriented as to suture plane, the orienting wheel 364 is firmly locked in the stem cavity of the peach and turning of the orienting wheel about a vertical axis most strongly resisted. Now, since the resistance to turning of this orienting wheel is greater than the difference between the forces of the springs 611 and 644, the roller 394 will pass straight through between the track 603 and the gate 620 and the so properly oriented peach will be carried by the conveyor to the fruit bisecting means L.

If, however, the peach is not properly oriented as to suture plane, the resistance of the peach to the turning of the orienting wheel 364 is less and the spring 611 forces the face 647 of the gauge 610 to push the roller 394 and the gate lever 620 laterally thereby disengaging the trigger 622 from the notch 636 of the sear 638 and the spring 640 by moving the tracks 634 and 636 inwardly moves the roller 436 into the opening 651 in the track 614 thereby opening the cups 266 and 268 to discharge the peach from the machine. After the improperly oriented, or unoriented, peach has been discharged from the machine, the roller 436 engages the cam surface 614d, thereby through the tracks 634 and 636 resetting the sear 638 and allowing the pawl 622 to re-engage the notch 641.

In order to assure the proper functioning of the sear and trigger the hump 652 is provided on the cam track 614. As the roller 394 associated with one cup assembly passes the gage 610, the roller 436 of the preceding cup assembly climbs the hump 652 and causes the sear 638 to turn anti-clockwise a sufficient amount to eliminate sear-trigger friction by providing a gap between the sear notch 641 and the trigger 622 so that the arm 620 may turn freely under the action of the differential springs 611 and 644 and the trigger releases the sear if the peach is not oriented as to suture plane. As that roller 436 passes the hump 652 it passes from the tracks 634 and 636 and the next roller 436 enters the tracks and the spring 640 returns the sear to the position shown in FIG. 38 unless the trigger 622 has been moved to sear-releasing position.

It should be noted that the springs of the inspecting mechanism may be, and preferably are, adjusted to cause rejection of peaches, or like fruit, oriented as to indent but not suture plane, as well as wholly unoriented fruit.

It should also be noted that during the operation of the machine water is constantly sprayed upon the carriages as they pass along the upper reach of the chain—through conventional water jets or nozzles (not shown)—to keep the carriages and associated parts clean or free of fruit acids and lubricate the orienting wheel and neoprene driving cones. Neoprene, or equivalent synthetic rubber material, is especially advantageous because of its easy lubrication with water and its ability to withstand fruit acids and the ever present oil necessary to keep the metal members of the machine properly lubricated.

It is apparent that many widely different embodiments of this invention may be made without departing from the spirit and scope thereof, and therefore it is not intended by this description to limit the invention except as indicated in the appended claims.

Having thus described the invention, what I claim as new and desire to secure by Letters Patent is:

1. In a fruit orientation machine, orientation inspection means comprising a rotary indent sensing member, means for applying a predetermined turning force to said rotary member, means operatively associated with the sensing member and responsive to the turning of said member by said applying means when a fruit is in engagement with said sensing member for indicating an unoriented fruit.

2. In a machine for handling indented fruit, a turnable indent sensing wheel adapted to engage fruit to determine its orientation, means connected to said member for applying a predetermined turning force to said wheel, and means responsive to the resistance to turning offered by a fruit when in engagement with said wheel for passing a properly oriented fruit and rejecting an unoriented fruit.

3. In a fruit orienting machine, a support, an orienting wheel carried by the support and mounted thereon for rotation about a predetermined axis to rotate and orient a fruit, means for receiving and confining fruit in engagement with the wheel, said wheel being adapted to penetrate the indent of the fruit to be oriented, means mounting said support for turning about an axis transverse to said axis of rotation to turn the wheel about said transverse axis, means operatively associated with the support for applying to the wheel a predetermined force tending to turn the wheel about said transverse axis, and means operatively associated with said wheel support for response to the turning of the wheel about said transverse axis for indicating unoriented fruit.

4. In a machine for orienting peaches or like indented and sutured fruit, a continuously moving endless conveyor, a plurality of fruit holding units mounted in equally spaced relation upon said endless conveyor, fruit orienting means mounted on the conveyor for movement with each of said holding units for orienting the fruit during the continuous movement of the endless conveyor, said fruit holding units each comprising a pair of cup sections mounted for movement toward and from each other from a position to confine the fruit in engagement with the orienting means to an open position to discharge the fruit, an actuating roller secured to one of each pair of cup sections, means interconnecting said cup sections of each pair for simultaneous movement between the fruit confining position and the fruit discharging position, track means for guiding and controlling the rollers secured to the cup sections, said track means including a stationary track section and a movable track section, means for inspecting said fruit as to orientation during the continuous movement of the conveyor, and means operatively associated with said inspecting means for moving said movable track section in a direction to shift an actuating roller in a direction to open the cup sections and discharge the fruit from said cup sections when an improperly oriented fruit in said cup sections is presented to said inspecting means.

5. In a machine for orienting and for inspecting as to orientation peaches, or like indented and sutured fruit, an endless conveyor, a plurality of fruit holding units comprising supports secured in equally spaced relation to said endless conveyor, fruit orienting means mounted on said supports for movement with each of said fruit holding units for orienting a fruit during the transportation of said units by the endless conveyor, said fruit holding units each comprising a pair of fruit holders mounted on the unit support for movement toward and from each other between a position confining the fruit in engagement with the orienting means and an open position to discharge the fruit, an actuating roller secured to one of each of said pair of holders, means interconnecting said holders of each pair for simultaneous movement between said fruit confining position and said fruit discharging position, shiftably mounted operating means operatively associated with the conveyor and positioned to engage said rollers as the fruit holding units are transported by said conveyor, means operatively associated with said orienting means for inspecting any fruit in the holders as to orientation during the transportation of the units by the conveyor, and means operatively associated with said operating means and controlled by said inspecting means for shifting said roller operating means in a direction to open a pair of holders containing an improperly oriented fruit.

6. In a fruit orienting machine including a support, a wheel carried by said support and rotatable relative thereto about a first axis to rotate and orient a fruit engaged with the wheel, said wheel being shaped to penetrate to maximum extent into the indent of the fruit when aligned with the suture plane of the fruit, means mounting said support for turning about an axis transverse to the axis of rotation of the wheel to revolve the wheel about such transverse axis, means operatively associated with the support for applying to the wheel a predetermined force tending to revolve the wheel about such transverse axis, and means operatively associated with the wheel support and responsive to the revolving of the wheel about such transverse axis for discharging a fruit the indent of which has not been penetrated to maximum extent by the wheel.

7. In a fruit orienting machine as set forth in claim 6, a conveyor moving continuously at a uniform rate, means for securing said support to said conveyor, said fruit discharging means comprising a first member secured to said support for movement on turning of the wheel about the transverse axis and a second member positioned adjacent the path of movement of the wheel support to be engaged by the first member as the support is moving continuously at said uniform rate with said conveyor and operated by the first member on turning of the wheel about such transverse axis whereby to discharge the fruit from the orienting wheel without interfering with the continuous movement of the conveyor.

8. In a fruit orienting machine, a support, a pair of cups for receiving a whole fruit therebetween, levers mounting said cups on said support for movement toward and from each other to receive and to release fruit, orienting means mounted on said support to engage fruit when received in said cups and including a rotatable member to revolve the fruit to a predetermined oriented position, a cup actuating lever and engaging cam members carried by said actuating lever and one of the cup mounting levers for effecting an actuating connection between the actuating lever and the cup lever when the actuating lever has been moved a predetermined amount to cause the subsequent predetermined movement of the actuating lever to move the cups a predetermined clearance distance from the fruit regardless of the size of the fruit.

9. In a fruit orienting machine, a fruit receiving carriage comprising an apertured fruit receiving plate, fruit orienting means mounted on said plate and including a rotatable member projecting through the aperture in said plate to rotate the fruit, a plurality of fruit clamps for receiving a whole fruit therebetween, parallel link means mounted on said plate for supporting each of said clamps, said parallel link means being mounted on pivot axes in a plane inclined downwardly toward the plate and said clamps being generally V-shaped in vertical section whereby to position on inward movement of said clamps whole fruit of variant sizes received between the clamps a predetermined distance from the plate and in engagement with the fruit rotating member.

10. In a fruit orienting machine, a fruit orienting wheel rotatable in a vertical plane, a pair of fruit holders for receiving a whole fruit therebetween and positioned above said wheel, parallel link means for supporting each of said holders, said parallel link means being mounted on pivot axes inclined downwardly toward the fruit rotating member and said holders having conical inner faces to centralize the fruit in engagement with the fruit rotating wheel regardless of the size of the fruit.

11. In a fruit orienting machine, a fruit orienting unit comprising a support, a fruit orienting member rotatably mounted on said support to engage and rotate the fruit, a pair of fruit receiving cup sections mounted on said support for movement above said orienting member toward and from each other to confine the fruit in engagement with the orienting member, each of said cup sections being generally conical in shape, a pair of diagonally opposite corners at the mouth of each cup section being of higher elevation than the other diagonally opposite corners at the mouth of each cup section to facilitate continued rotation of the fruit when in engagement with the orienting member.

12. In a fruit orienting machine including a rotatable wheel for rotating whole fruit to orient the same, means for confining fruit to be oriented into engagement with said wheel for rotation thereby, said rotatable wheel having spaced peripheral notches extending generally parallel to its axis of rotation and driving mechanism including a synthetic rubber cone resiliently engaging the periphery of the wheel to rotate the same and having formed in the surface thereof by reason of its driving engagement with the wheel teeth meshing with the notches in the wheel.

13. In a fruit orienting machine, a fruit holder comprising a base plate having an aperture therein, a fruit orienting unit operatively associated with the base plate and comprising a rotatable fruit orienting wheel projecting through the aperture in said plate to engage and support fruit a predetermined distance above said plate, and a pair of fruit receiving cup sections operatively associated with said orienting wheel and mounted on said plate for movement thereabove toward and from each other to confine the fruit to be oriented upon said rotatable wheel, each of said cup sections being generally conical in shape, a pair of diagonally opposite corners at the mouth of each cup section being relieved to minimize cup resistance to turning by said rotatable wheel of a fruit in a direction away from said corners and other diagonally opposite corners at the mouth of each cup section toward which the rotatable wheel rotates the fruit being raised to facilitate the continued rotation of the fruit.

14. In a fruit orienting machine, a frame, an elongated endless conveyor on said frame, a plurality of fruit receiving carriages on said frame and operatively associated with said conveyor in spaced relation, a plurality of fruit orienting units, one for each of said carriages, each of said carriages comprising a support secured to said conveyor, an apertured fruit receiving plate secured to said support and a pair of fruit holding clamps, orienting unit mounting means shiftably mounting each orienting unit on the support of its associated carriage for movement toward and from the fruit receiving plate, each orienting unit comprising a rotating orienting member projecting through the aperture in said plate in one position of the unit relative to the plate, each of said carriages also comprising clamp mounting means securing said clamps on said support in operative association with said fruit receiving plate for movement toward each other downwardly at an angle relative to the plate whereby to position the fruit regardless of size in engagement with the rotating orienting member when said member is positioned to project through said plate aperture, orienting unit actuator means on the frame and operatively associated with the conveyor for shifting each orienting unit to said one position, and clamp actuator means on the frame adjacent said orienting unit actuator means and operatively associated with the conveyor to effect said movement of the clamps.

15. In a fruit handling machine comprising a frame, an elongated endless conveyor, a plurality of fruit receiving carriage units comprising a support slidably mounted on the frame and secured to said conveyor in spaced relation, a plurality of fruit orienting units one for each of said carriage units and secured to said support, each of said orienting units comprising a rotatable fruit supporting and rotating member operatively associated with said support and each of said carriage units comprising a pair of oppositely movable fruit holders, fruit holder mounting means securing said fruit holders on said support above said members for movement from an open position to a fruit holding position downwardly at an angle to the axis of rotation of said fruit rotating member whereby to position the fruit regardless of size in supporting engagement with said rotating member, and fruit holder actuator means on the frame and operatively associated with the conveyor.

16. In a fruit handling machine comprising a frame, an elongated endless conveyor on the frame, a plurality of fruit carriage units on the frame and secured to said conveyor in spaced relation, a plurality of fruit orienting units one for each of said carriage units, each of said carriage units comprising a support, a pair of fruit holders mounted on said support for movement between an open fruit receiving position, a closed fruit holding position and an intermediate fruit clearance confining position, each of said orienting units comprising a wheel, means rotatably mounting said wheel upon said support and positioning said wheel beneath said holders to engage fruit in the holders, wheel rotating means carried by said support, holder actuating means carried by the support and operatively connected to said fruit holders for moving the holders of each carriage unit between said three positions, holder actuator means on the frame and operatively associated with said conveyor to actuate the holder actuator means of said carriage units in proper timed relation, and wheel drive means on the frame operatively associated with said conveyor adjacent said holder actuator means to drive said wheel rotating means in proper timed relation to the movement of an associated pair of fruit holders to said three positions to rotate and orient the fruit while said holders are in intermediate fruit clearance confining position, said wheel drive means comprising an endless chain on the frame extending parallel to a portion of the conveyor and the wheel rotating means comprises sprockets on the supports positioned for successive engagement with said chain as the carriage units are transported by said conveyor and chain drive means on the frame operatively associated with the conveyor to continuously drive said endless chain in the direction opposite to said conveyor.

17. In a fruit handling machine comprising a frame, an elongated endless conveyor on the frame, a plurality of fruit carriage units on the frame and secured to said conveyor in spaced relation, a plurality of fruit orienting units one for each of said carriage units, each of said carriage units comprising a support, a pair of fruit holders mounted on said support for movement between an open fruit receiving position, a closed fruit holding position and an intermediate fruit clearance confining position, each of said orienting unit comprising a wheel, means rotatably mounting said wheel upon said support and positioning said wheel beneath said holders to engage fruit in the holders, wheel rotating means carried by said support, holder actuating means carried by the support and operatively connected to said fruit holders for moving the holders of each carriage unit between said three positions, holder actuator means on the frame and operatively associated with said conveyor to actuate the holder actuator means of said carriage units in proper timed relation, and wheel drive means on the frame operatively associated with said conveyor adjacent said holder actuator means to drive said wheel rotating means in proper timed relation to the movement of an associated pair of fruit holders to said three positions to rotate and orient the fruit while said holders are intermediate fruit clearance confining position, the said wheel drive means comprising an endless chain on the frame extending parallel to a portion of the conveyor, and said wheel rotating means comprising drive sprockets on the supports positioned for successive engagement with said chain as the carrier units are transported by said conveyor.

References Cited in the file of this patent
UNITED STATES PATENTS 2,769,521     Hait _____ Nov. 6, 1956
2,788,818     Skog _____ Apr. 16, 1957